US012568466B2

(12) United States Patent
Cheng et al.

(10) Patent No.: US 12,568,466 B2
(45) Date of Patent: *Mar. 3, 2026

(54) PAGING IN SIDELINK LAYER 3 RELAY SYSTEMS

(71) Applicant: QUALCOMM Incorporated, San Diego, CA (US)

(72) Inventors: Peng Cheng, Beijing (CN); Ozcan Ozturk, San Diego, CA (US); Karthika Paladugu, San Diego, CA (US); Qing Li, Princeton Junction, NJ (US); Hong Cheng, Basking Ridge, NJ (US); Gavin Bernard Horn, La Jolla, CA (US); Dan Vassilovski, Del Mar, CA (US)

( * ) Notice: Subject to any disclaimer, the term of this patent is extended or adjusted under 35 U.S.C. 154(b) by 439 days.

This patent is subject to a terminal disclaimer.

(21) Appl. No.: 18/001,020

(22) PCT Filed: Jul. 17, 2020

(86) PCT No.: PCT/CN2020/102561
§ 371 (c)(1),
(2) Date: Dec. 7, 2022

(87) PCT Pub. No.: WO2022/011662
PCT Pub. Date: Jan. 20, 2022

(65) Prior Publication Data
US 2023/0224859 A1 Jul. 13, 2023

(51) Int. Cl.
*H04W 68/02* (2009.01)
*H04W 88/04* (2009.01)

(52) U.S. Cl.
CPC ............ *H04W 68/02* (2013.01); *H04W 88/04* (2013.01)

(58) Field of Classification Search
CPC .............................. H04W 68/02; H04W 88/04
(Continued)

(56) References Cited

U.S. PATENT DOCUMENTS

2003/0233329 A1* 12/2003 Laraki ..................... H04L 67/04
705/52
2012/0238208 A1* 9/2012 Bienas ................ H04W 68/005
455/41.2
(Continued)

FOREIGN PATENT DOCUMENTS

CN 110402605 A 11/2019
EP 3499975 A1 6/2019
(Continued)

OTHER PUBLICATIONS

Apple, et al., "R17 Sidelink Relay," 3GPP TSG RAN Meeting #86, RP-193106, Sitges, Spain, Dec. 9-12, 2019, the whole document, pp. 1-5.
(Continued)

*Primary Examiner* — Mark G. Pannell

(57) ABSTRACT
Certain aspects of the present disclosure provide techniques for paging in sidelink L2 relay scenarios. An example method generally includes connecting, via a sidelink, to a relay user equipment (UE) connected to a network entity; receiving, from a network entity via the relay UE, configuration information identifying a paging mode for the remote UE; and monitoring for paging from the network entity, in accordance with the identified paging mode.

32 Claims, 23 Drawing Sheets

(58) Field of Classification Search
USPC ......................................................... 455/458
See application file for complete search history.

(56) References Cited

U.S. PATENT DOCUMENTS

| | | | | |
|---|---|---|---|---|
| 2019/0261309 | A1* | 8/2019 | Martin .................. | H04W 76/14 |
| 2020/0068380 | A1* | 2/2020 | Wallentin .............. | H04W 76/14 |
| 2020/0092845 | A1* | 3/2020 | Cai ........................ | H04W 68/02 |
| 2020/0145867 | A1 | 5/2020 | Tseng et al. | |
| 2020/0252989 | A1* | 8/2020 | Chen .................... | H04W 76/19 |
| 2021/0105787 | A1* | 4/2021 | Park .................... | H04W 72/542 |
| 2022/0346179 | A1* | 10/2022 | Yang ..................... | H04W 76/34 |
| 2023/0224858 | A1* | 7/2023 | Cheng .................. | H04W 68/02 |
| | | | | 455/458 |

FOREIGN PATENT DOCUMENTS

| | | |
|---|---|---|
| WO | 2018082541 A1 | 5/2018 |
| WO | 2018083381 A1 | 5/2018 |

OTHER PUBLICATIONS

International Search Report and Written Opinion—PCT/CN2020/102561—ISA/EPO—Apr. 16, 2021.
Sequans Communications: "Sidelink Enhancements for Power Efficient PC5 Maintenance and Connection Establishment," 3GPP TSG-RAN WG2 Meeting #96, R2-168920, Reno, USA, Nov. 14-18, 2016, 4 pages, the whole document.

* cited by examiner

Remote UE     PC5     Layer 3 UE-to-NW Relay UE

1500

1502

CONNECT, VIA A SIDELINK, TO A RELAY USER EQUIPMENT (UE) CONNECTED TO A NETWORK ENTITY

1504

RECEIVE, FROM THE RELAY UE, CONFIGURATION INFORMATION IDENTIFYING A PAGING MODE FOR THE REMOTE UE

1506

MONITOR FOR PAGING FROM THE NETWORK ENTITY, IN ACCORDANCE WITH THE IDENTIFIED PAGING MODE

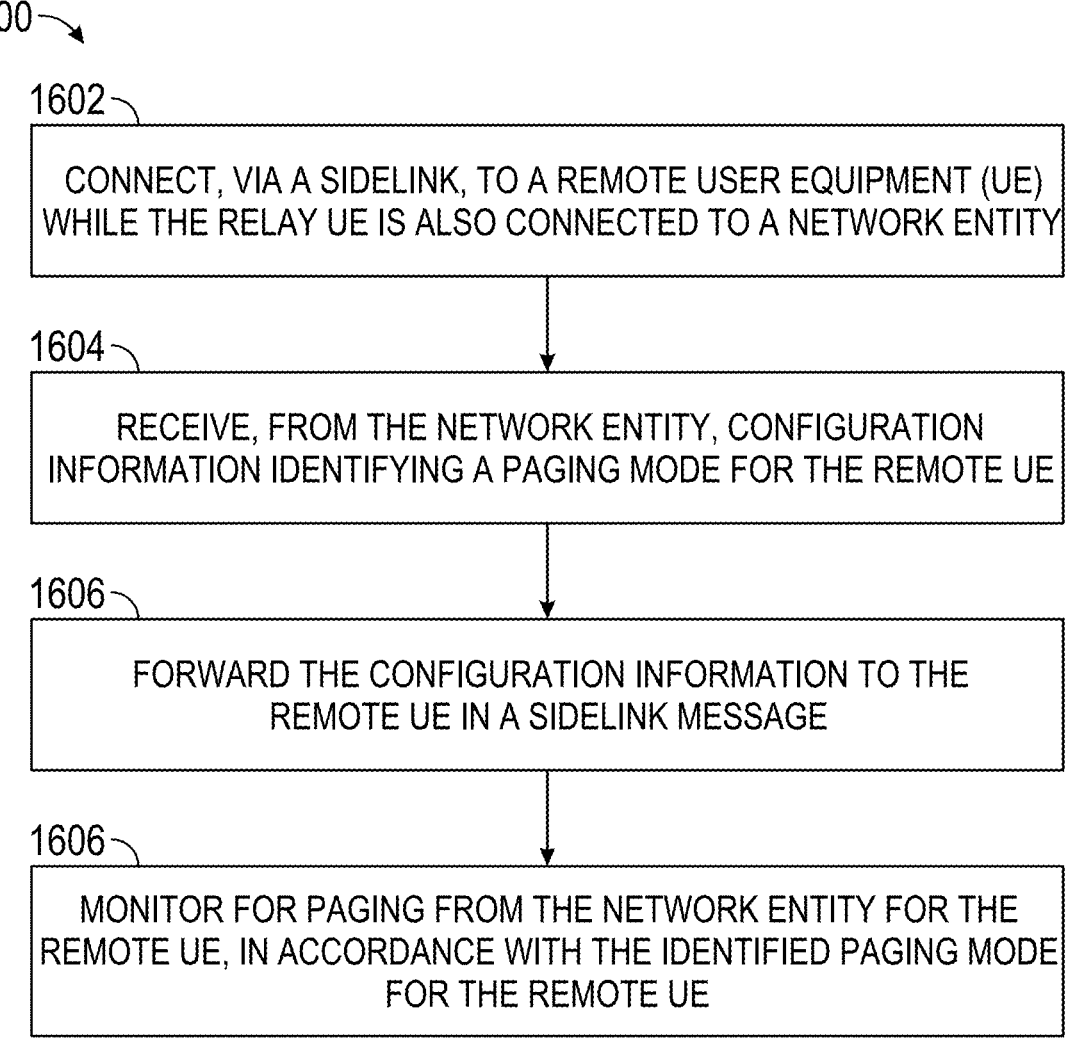

1600

1602

CONNECT, VIA A SIDELINK, TO A REMOTE USER EQUIPMENT (UE) WHILE THE RELAY UE IS ALSO CONNECTED TO A NETWORK ENTITY

1604

RECEIVE, FROM THE NETWORK ENTITY, CONFIGURATION INFORMATION IDENTIFYING A PAGING MODE FOR THE REMOTE UE

1606

FORWARD THE CONFIGURATION INFORMATION TO THE REMOTE UE IN A SIDELINK MESSAGE

1606

MONITOR FOR PAGING FROM THE NETWORK ENTITY FOR THE REMOTE UE, IN ACCORDANCE WITH THE IDENTIFIED PAGING MODE FOR THE REMOTE UE

CONNECT TO A RELAY USER EQUIPMENT (UE) THAT IS CONNECTED TO A REMOTE UE

1704

TRANSMIT, TO THE RELAY UE, CONFIGURATION INFORMATION IDENTIFYING A PAGING MODE FOR THE REMOTE UE TO BE DECODED AND FORWARDED TO THE REMOTE UE

1706

TRANSMIT PAGING INTENDED FOR THE REMOTE UE

| relay / remote | IDLE | INACTIVE | CONNECTED |
|---|---|---|---|
| IDLE | Direct-paging or forward-paging<br>• Up to gNB configuration | Direct-paging only<br>• RAN paging for relay<br>• CN paging for remote UE | Not valid |
| CONNECTED | Not valid | Not valid | No need of paging<br>•Relay forwards SIB upon reception of paging for SIB update |

2300

2400

2402

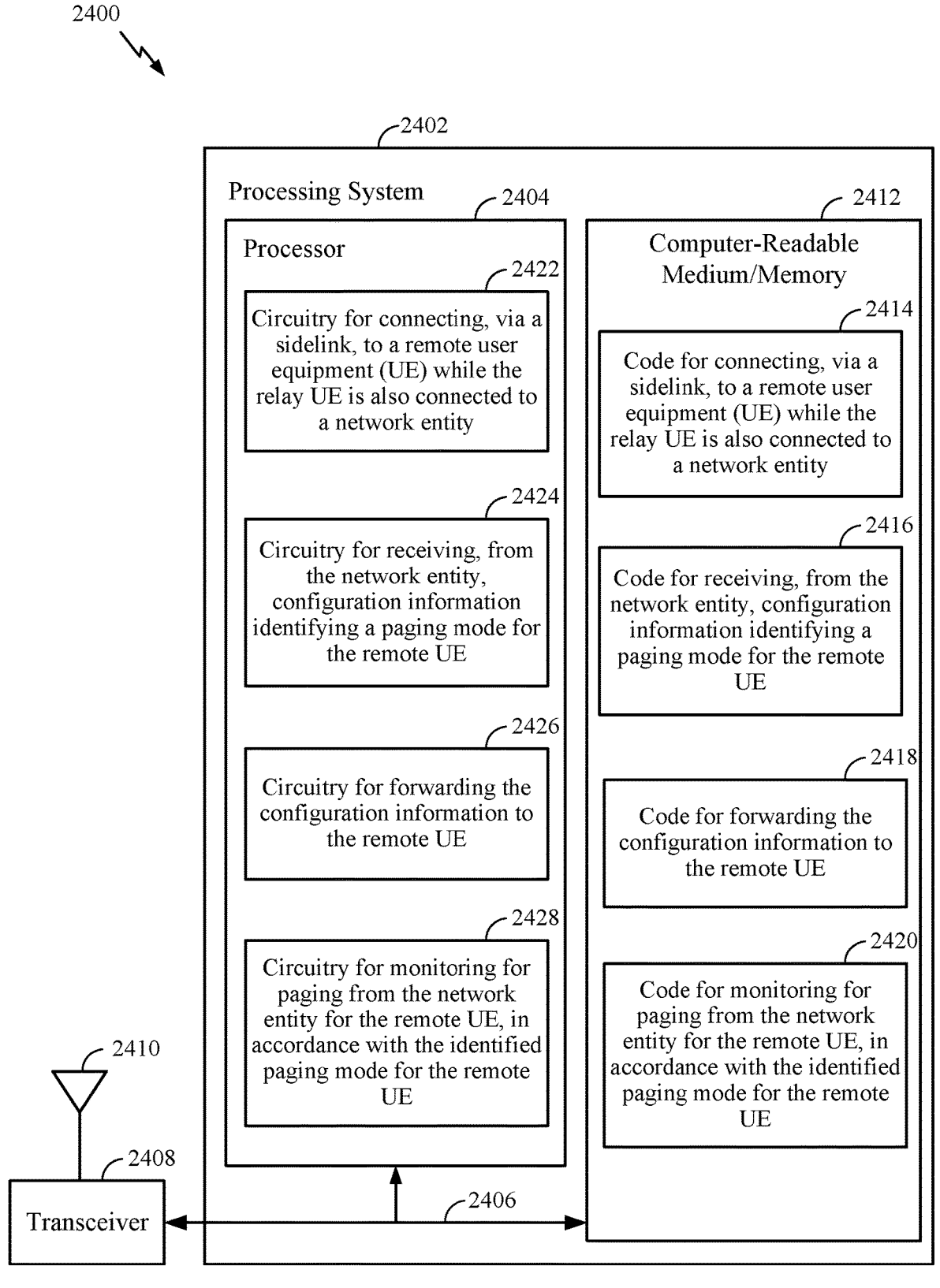

Processing System

Processor ─ 2404

Circuitry for connecting, via a sidelink, to a remote user equipment (UE) while the relay UE is also connected to a network entity ─ 2422

Circuitry for receiving, from the network entity, configuration information identifying a paging mode for the remote UE ─ 2424

Circuitry for forwarding the configuration information to the remote UE ─ 2426

Circuitry for monitoring for paging from the network entity for the remote UE, in accordance with the identified paging mode for the remote UE ─ 2428

Computer-Readable Medium/Memory ─ 2412

Code for connecting, via a sidelink, to a remote user equipment (UE) while the relay UE is also connected to a network entity ─ 2414

Code for receiving, from the network entity, configuration information identifying a paging mode for the remote UE ─ 2416

Code for forwarding the configuration information to the remote UE ─ 2418

Code for monitoring for paging from the network entity for the remote UE, in accordance with the identified paging mode for the remote UE ─ 2420

2410

2408

Transceiver

PAGING IN SIDELINK LAYER 3 RELAY SYSTEMS

CROSS-REFERENCE TO RELATED APPLICATIONS

This application is a national stage application under 35 U.S.C. 371 of PCT/CN2020/102561, filed Jul. 17, 2020, which is hereby assigned to the assignee hereof and hereby expressly incorporated by reference herein in its entirety as if fully set forth below and for all applicable purposes.

FIELD OF THE DISCLOSURE

Aspects of the present disclosure relate to wireless communications, and more particularly, to techniques for paging communications in sidelink layer 3 (L3) relay systems.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Sidelink communications are communications from one UE to another UE. As the demand for mobile broadband access continues to increase, there exists a need for further improvements in NR and LTE technology, including improvements to sidelink communications. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a remote user equipment (UE). The method generally includes connecting, via a sidelink, to a relay user equipment (UE) connected to a network entity; receiving, from the relay UE, configuration information identifying a paging mode for the remote UE; and monitoring for paging from the network entity, in accordance with the identified paging mode.

Certain aspects provide a method for wireless communication by a relay node. The method generally includes connecting, via a sidelink, to a remote user equipment (UE) while the relay UE is also connected to a network entity; receiving, from the network entity, configuration information identifying a paging mode for the remote UE; forwarding the configuration information to the remote UE in a sidelink message; and monitoring for paging from the network entity for the remote UE, in accordance with the identified paging mode for the remote UE.

Certain aspects provide a method for wireless communication by a network entity. The method generally includes connecting to a relay user equipment (UE) that is connected to a remote UE; transmitting, to the relay UE, configuration information identifying a paging mode for the remote UE to be decoded and forwarded to the remote UE; and transmitting paging intended for the remote UE.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 16 is a flow diagram illustrating example operations that may be performed by a relay UE, in accordance with certain aspects of the present disclosure.

FIG. 24 illustrates a communications device that may include various components configured to perform the operations illustrated in FIG. 16, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
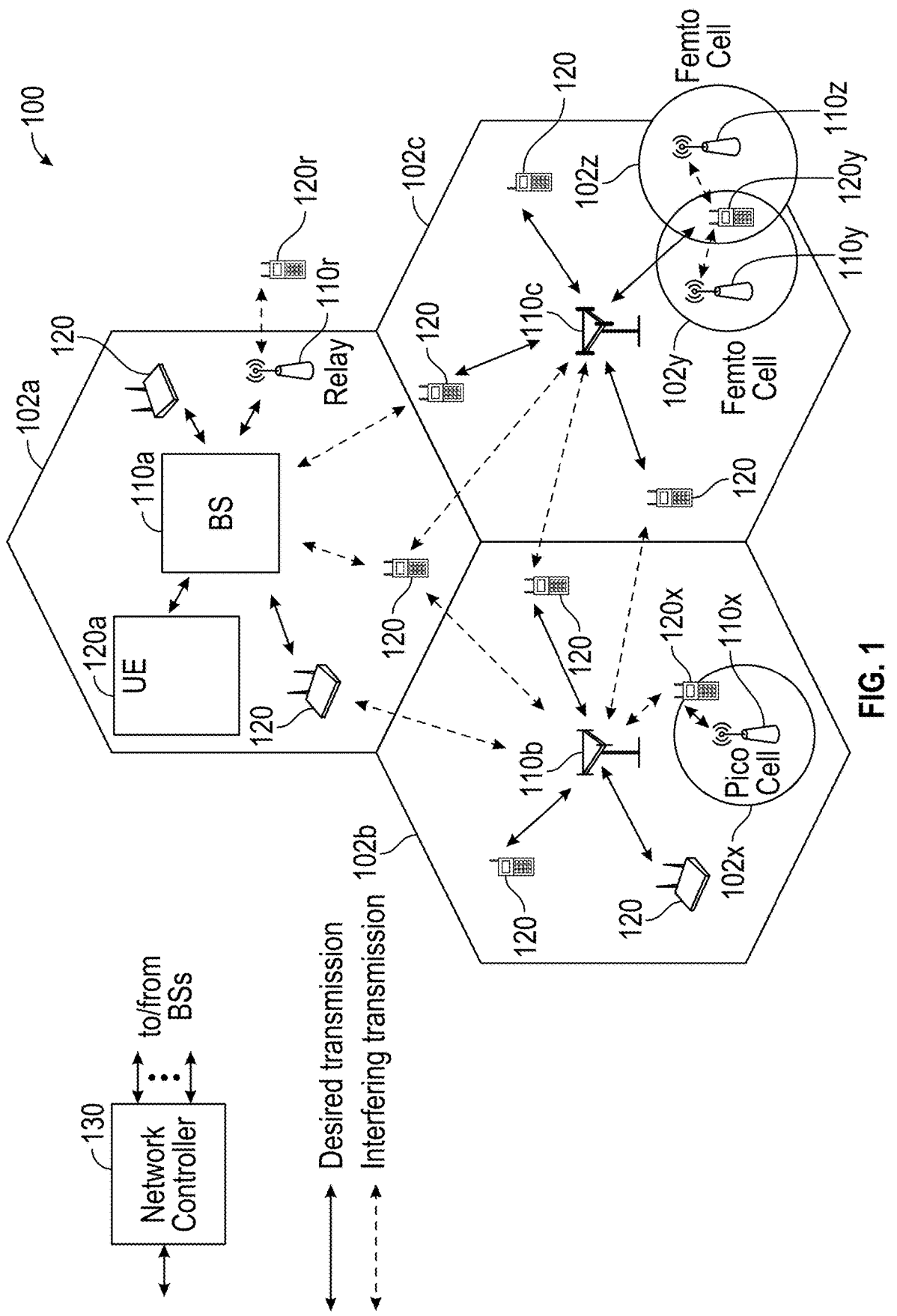
FIG. 1 is a block diagram conceptually illustrating an example telecommunications system, in accordance with certain aspects of the present disclosure.

Aspects of the present disclosure provide apparatus, methods, processing systems, and computer readable mediums for paging communications in sidelink layer 3 (L3) relay systems.

The connection between the relay and the network entity, may be called a Uu connection or via a Uu path. The connection between the remote UE and the relay (e.g., another UE or a "relay UE"), may be called a PC5 connection or via a PC5 path. The PC5 connection is a device-to-device connection that may take advantage of the comparative proximity between the remote UE and the relay UE (e.g., when the remote UE is closer to the relay UE than to the closest base station). The relay UE may connect to an infrastructure node (e.g., gNB) via a Uu connection and relay the Uu connection to the remote UE through the PC5 connection.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. Cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). Cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

FIG. 1 illustrates an example wireless communication network 100 in which aspects of the present disclosure may be performed. For example, UEs 120a and/or BS 110a of FIG. 1 may be configured to perform operations 1100, 1200, and 1300 described below with reference to FIGS. 15, 16, and 17 to process paged communications in sidelink L3 relay scenarios.

As illustrated in FIG. 1, the wireless communication network 100 may include a number of base stations (BSs) 110a-z (each also individually referred to herein as BS 110 or collectively as BSs 110) and other network entities. In aspects of the present disclosure, a roadside service unit (RSU) may be considered a type of BS, and a BS 110 may be referred to as an RSU. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay UEs (e.g., relay UE 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC- FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
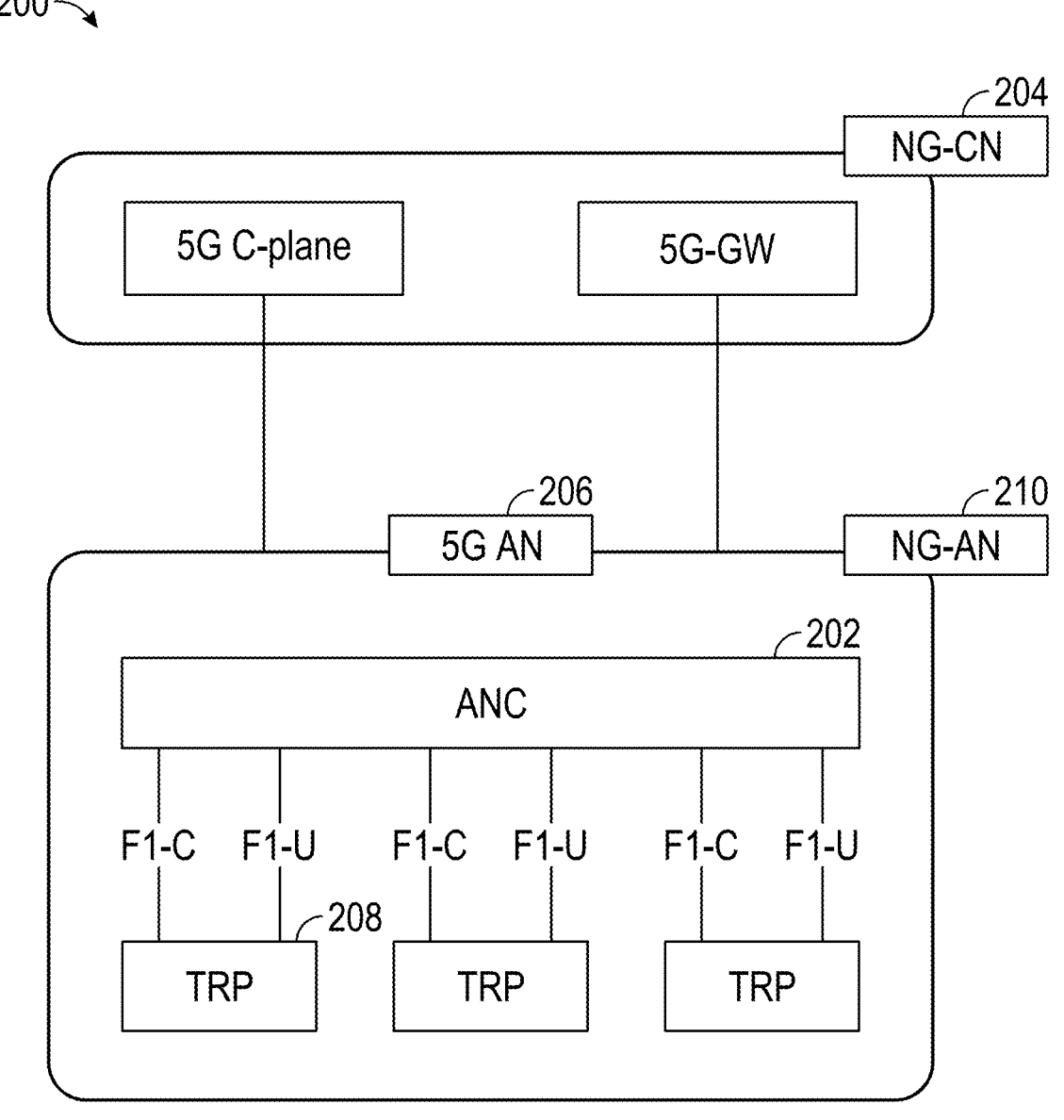
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
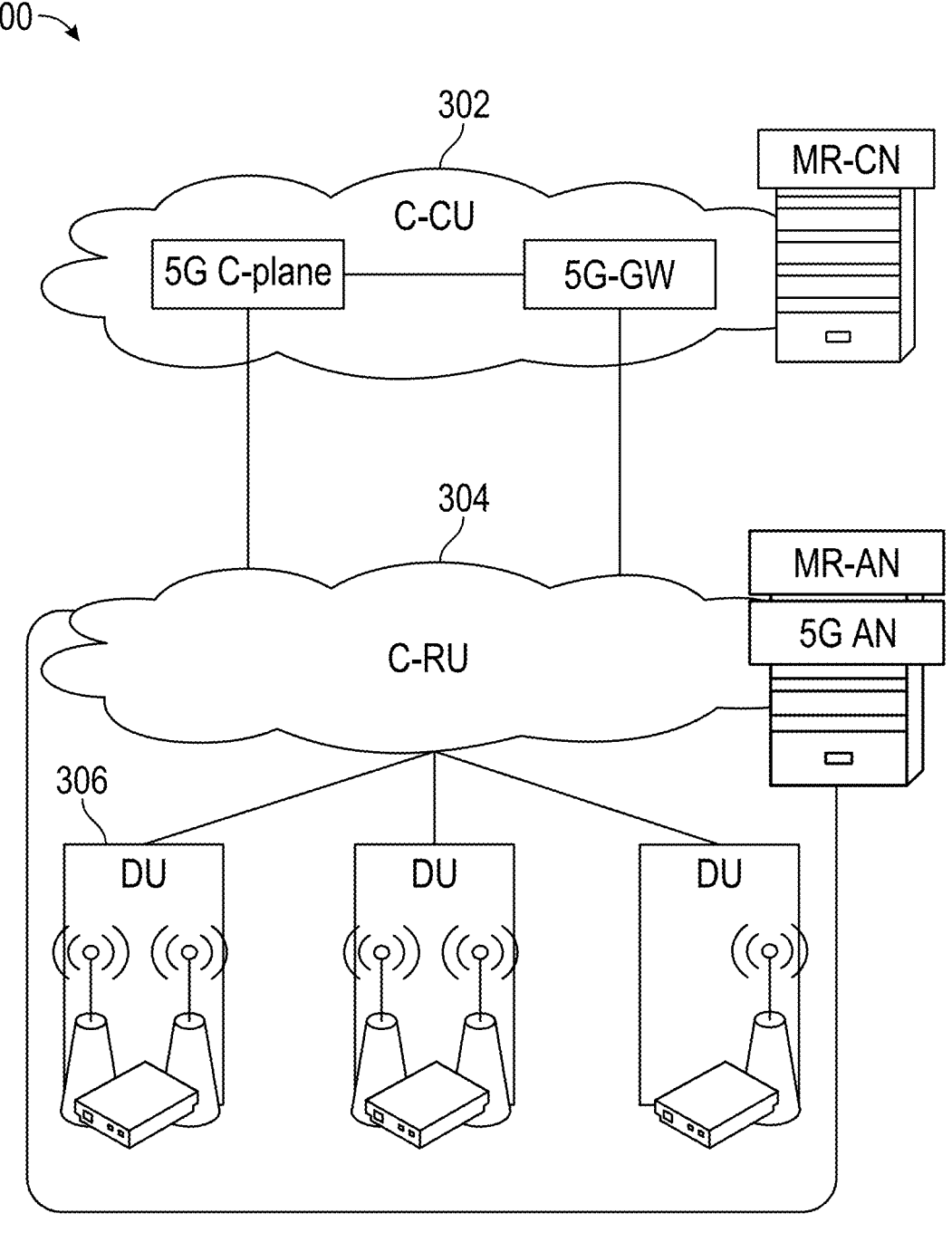
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
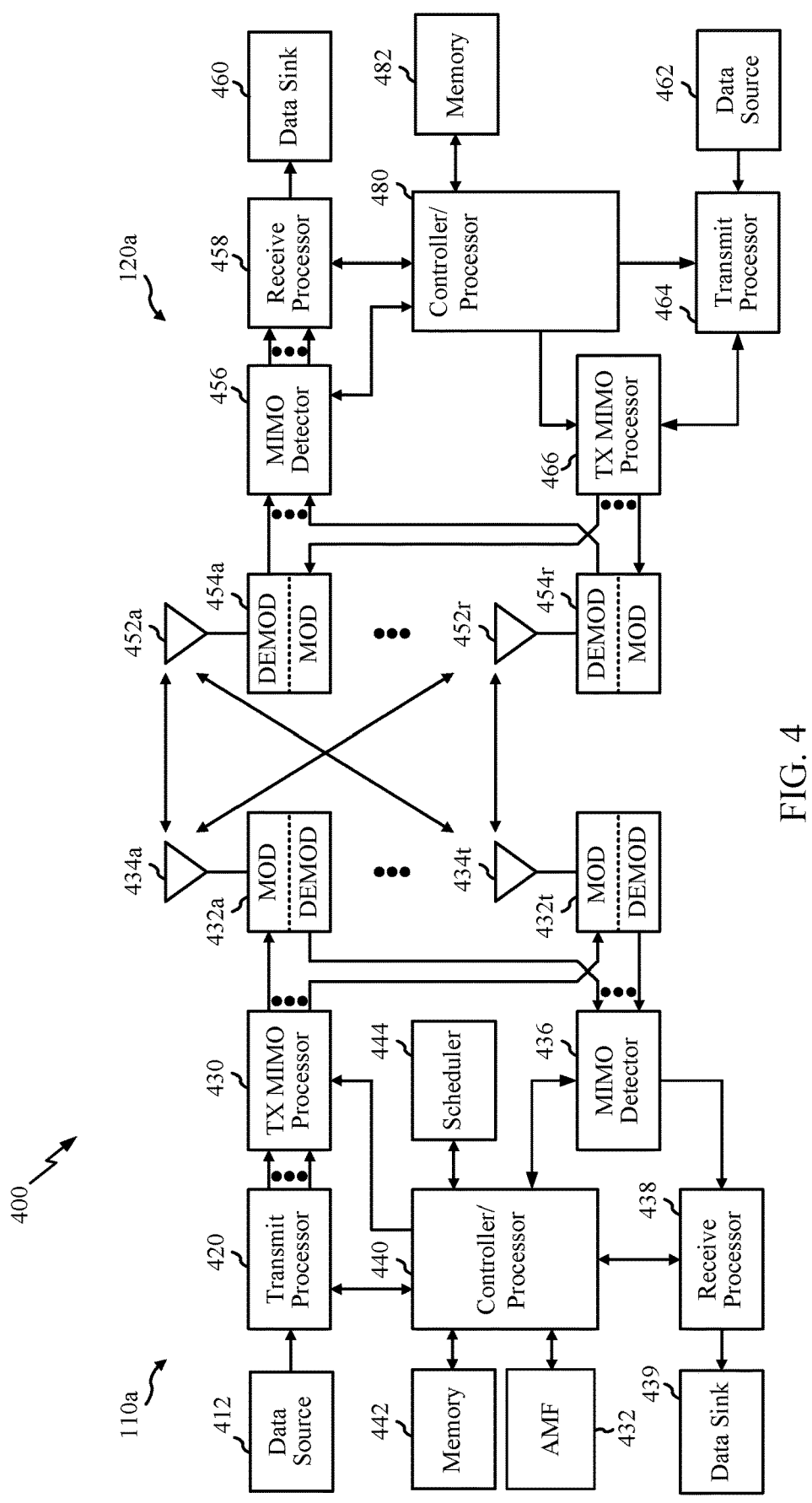
FIG. 4 is a block diagram conceptually illustrating a design of an example base station (BS) and user equipment (UE), in accordance with certain aspects of the present disclosure.

FIG. 4 illustrates example components of BS 110a and UE 120a (as depicted in FIG. 1), which may be used to implement aspects of the present disclosure. For example, antennas 452, processors 466, 458, 464, and/or controller/processor 480 of the UE 120a and/or antennas 434, processors 420, 430, 438, and/or controller/processor 440 of the BS 110a may be used to perform the various techniques and methods described herein with reference to FIGS. 15, 16, and 17.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120a, the antennas 452a through 452r may receive the downlink signals from the base station 110a and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On the uplink, at UE 120a, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110a. At the BS 110a, the uplink signals from the UE 120a may be received by the antennas 434, processed by the modulators 432, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

The controllers/processors 440 and 480 may direct the operation at the BS 110a and the UE 120a, respectively. The processor 440 and/or other processors and modules at the BS 110a may perform or direct the execution of processes for the techniques described herein with reference to FIGS. 15, 16, and 17.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Example UE to NW Relay

Figure 5:
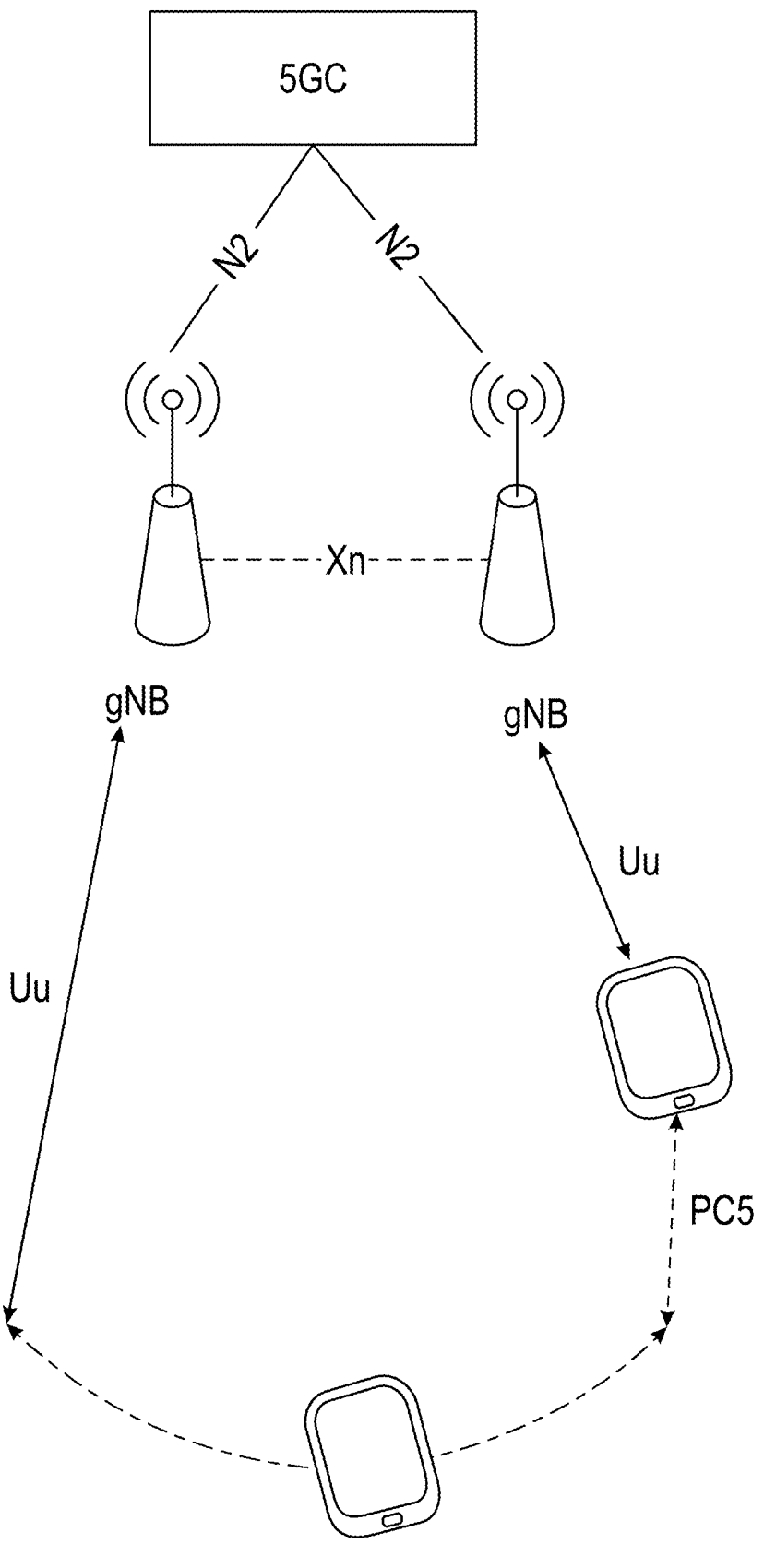
FIG. 5 is a high level path diagram illustrating example connection paths of a remote user equipment (UE), in accordance with certain aspects of the present disclosure.

Aspects of the present disclosure involves a remote UE, a relay UE, and a network, as shown in FIG. 5, which is a high level path diagram illustrating example connection paths: a Uu path (cellular link) between a relay UE and the network gNB, a PC5 path (D2D link) between the remote UE and the relay UE. The remote UE and the relay UE may be in radio resource control (RRC) connected mode.

Figure 6:
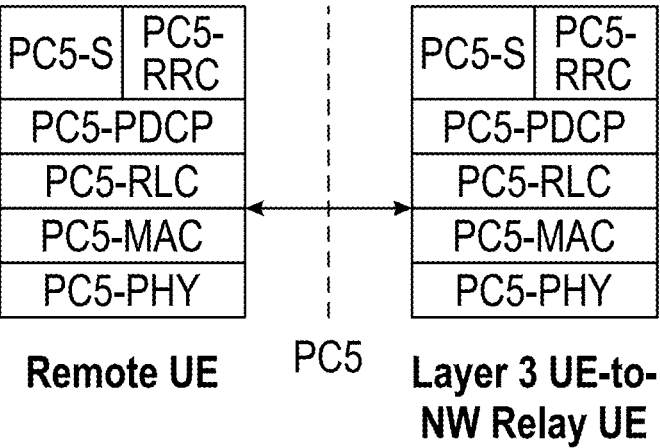
FIG. 6 is an example block diagram illustrating a control plane protocol stack on L3, when there is no direct connection path between the remote UE and the network node, in accordance with certain aspects of the present disclosure.
Figure 7:
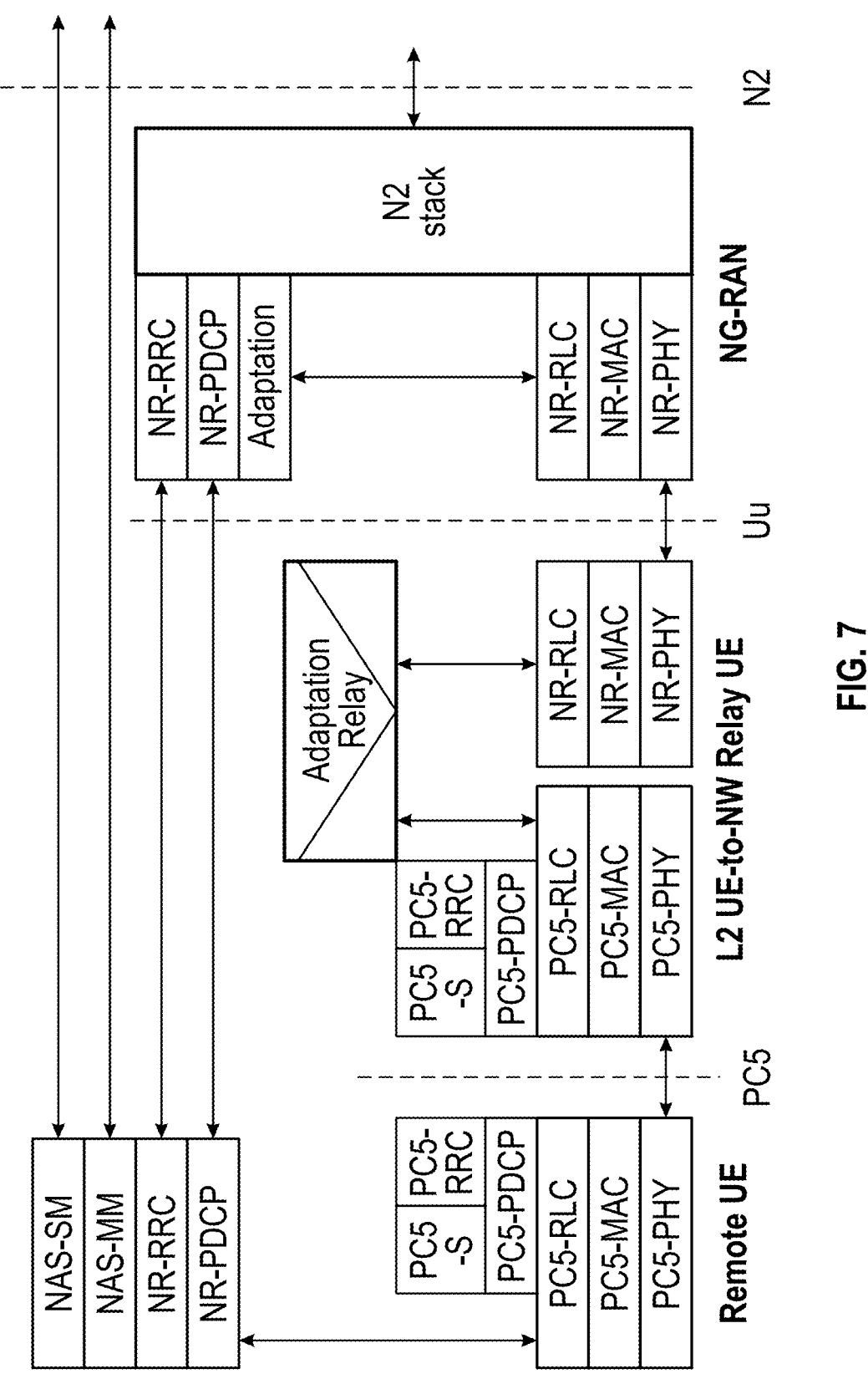
FIG. 7 is an example block diagram illustrating a control plane protocol stack on L2, when there is direct connection path between the remote UE and the network node, in accordance with certain aspects of the present disclosure.

As shown in FIG. 6 and FIG. 7, remote UE may generally connect to a relay UE via a layer 3 (L3) connection with no Uu connection with (and no visibility to) the network or via a layer 2 (L2) connection where the UE supports Uu access stratum (AS) and non-AS connections (NAS) with the network.

FIG. 6 is an example block diagram illustrating a control plane protocol stack on L3, when there is no direct connection path (Uu connection) between the remote UE and the network node. In this situation, the remote UE does not have a Uu connection with a network and is connected to the relay UE via PC5 connection only (e.g., Layer 3 UE-to-NW). The PC5 unicast link setup may, in some implementations, be needed for the relay UE to serve the remote UE. The remote UE may not have a Uu application server (AS) connection with a radio access network (RAN) over the relay path. In other cases, the remote UE may not have direct none access stratum (NAS) connection with a 5G core network (5GC). The relay UE may report to the 5GC about the remote UE's presence. Alternatively and optionally, the remote UE may be visible to the 5GC via a non-3GPP interworking function (N3IWF).

FIG. 7 is an example block diagram illustrating a control plane protocol stack on L2, when there is direct connection path between the remote UE and the network node. This control plane protocol stack refers to an L2 relay option based on NR-V2X connectivity. Both PC5 control plane (C-plane) and the NR Uu C-plane are on the remote UE, similar to what is illustrated in FIG. 6. The PC5 C-plane may set up the unicast link before relaying. The remote UE may support the NR Uu AS and NAS connections above the PC5 radio link control (RLC). The NG-RAN may control the remote UE's PC5 link via NR radio resource control (RRC). In some embodiments, an adaptation layer may be needed to support multiplexing multiple UEs traffic on the relay UE's Uu connections.

Certain systems, such as NR, may support standalone (SA) capability for sidelink-based UE-to-network and UE-to-UE relay communications, for example, utilizing layer-3 (L3) and layer-2 (L2) relays, as noted above.

Mechanisms may also be provided for relay selection and reselection. Relay selection generally refers the procedure whereby a remote UE has not connected to any relay node, discovers relay nodes whose sidelink discovery reference signal receive power (SD-RSRP) is above a threshold level (possibly by some amount) and, from among them, selects the relay node with best SD-RSRP. Relay re-selection generally refers the procedure whereby the remote UE has connected to one relay node (e.g., already performed relay selection), when SD-RSRP of the current relay node falls below a threshold level (possibly by some amount), the remote UE discovers relay nodes whose SD-RSRP is above a threshold level (possibly by some amount) and, among them, (re-)selects the relay node with the best SD-RSRP.

Figure 8:
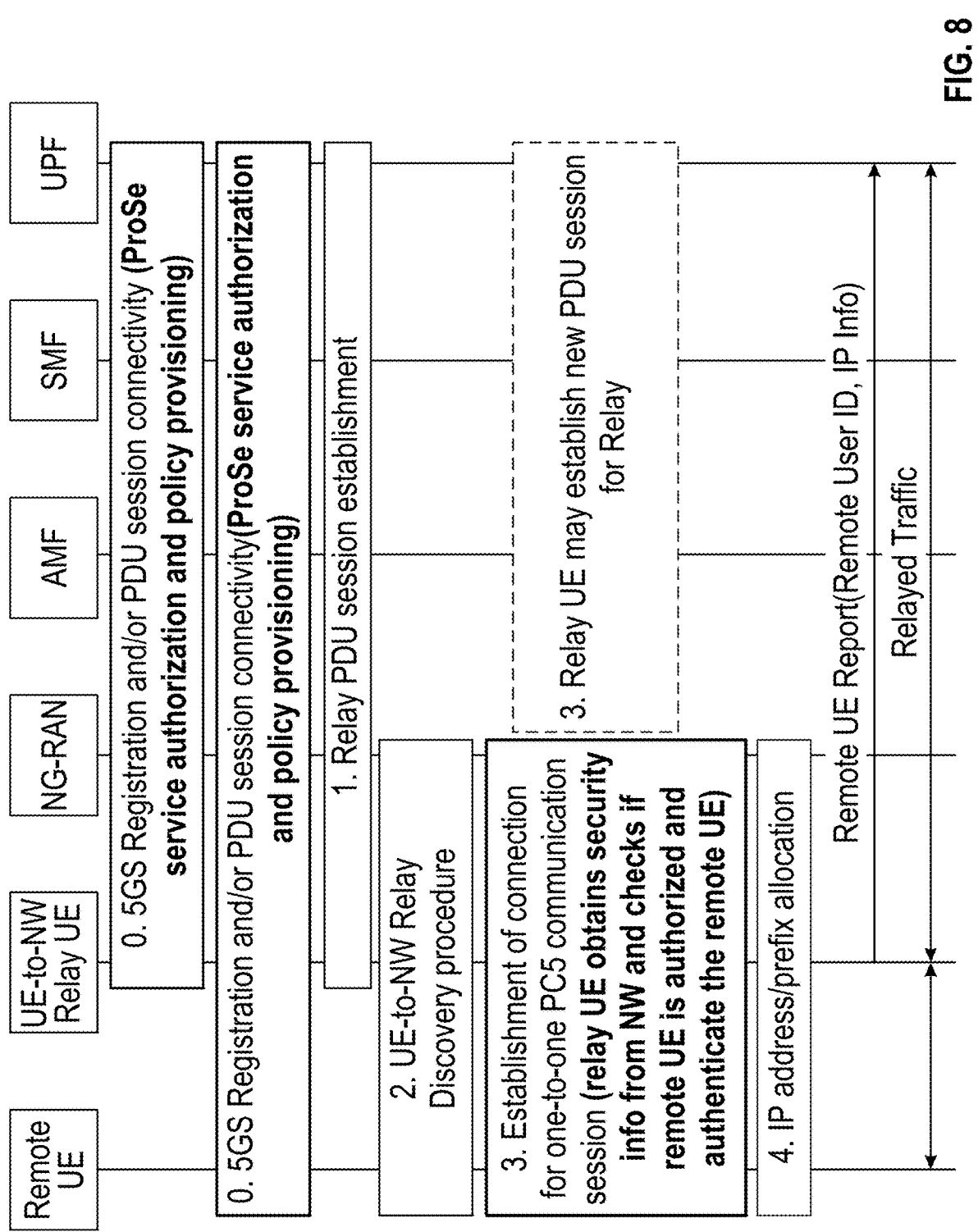
FIG. 8 illustrates example layer 3 (L3) relay procedures, in accordance with certain aspects of the present disclosure.

Particular relay procedures may depend on whether a relay is a L3 or L2 relay. FIG. 8 illustrates an example dedicated PDU session for an L3 relay. In the illustrated scenario, a remote UE establishes PC5-S unicast link setup and obtains an IP address. The PC5 unicast link AS configuration is managed using PC5-RRC. The relay UE and remote UE coordinate on the AS configuration. The relay UE may consider information from RAN to configure PC5 link. Authentication/authorization of the remote UE access to relaying may be done during PC5 link establishment. In the illustrated example, the relay UE performs L3 relaying.

Figure 9:
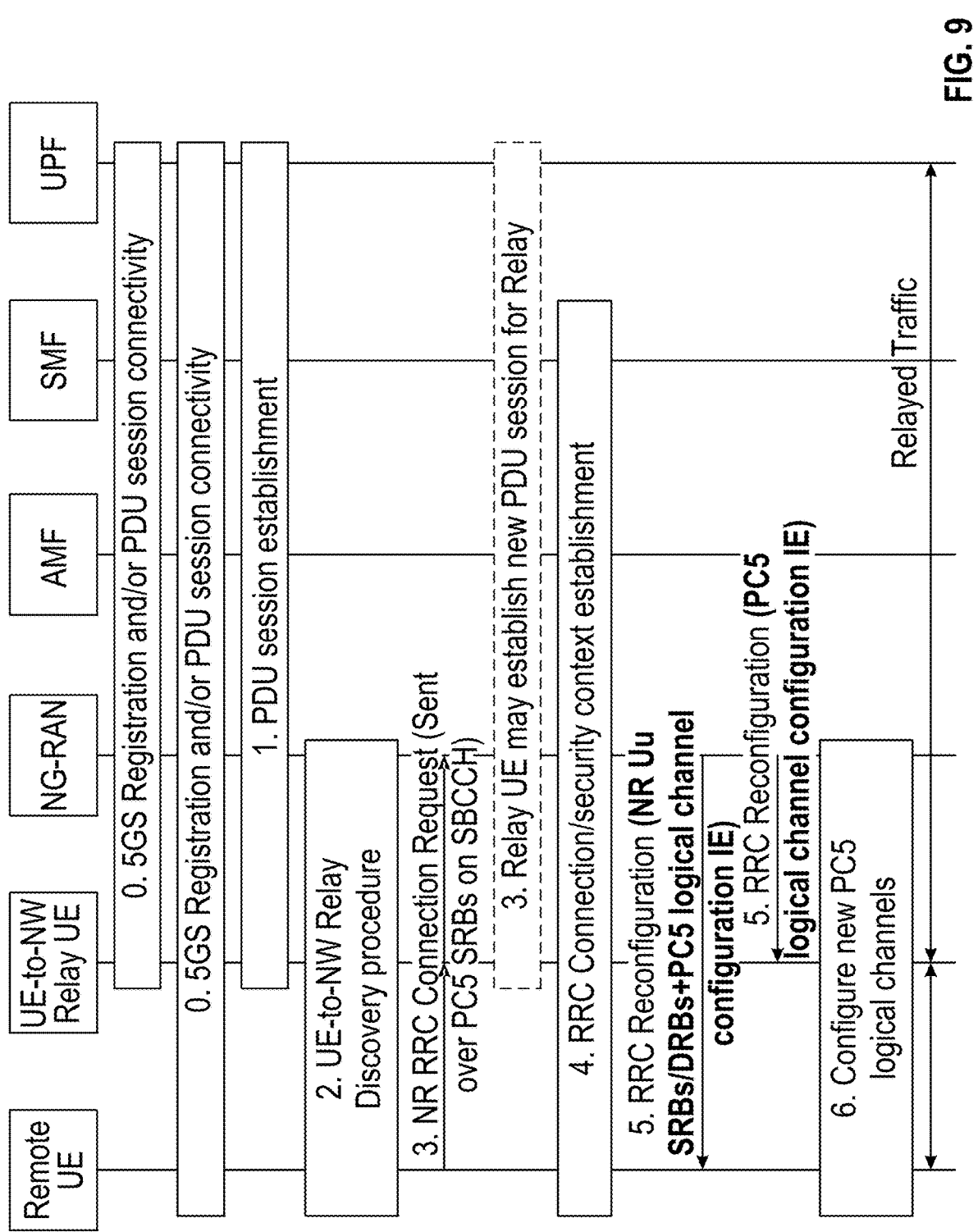
FIG. 9 illustrates example layer 2 (L2) relay procedures, in accordance with certain aspects of the present disclosure.

FIG. 9 illustrates an example dedicated PDU session for an L2 relay. In the illustrated scenario, there is no PC5 unicast link setup prior to relaying. The remote UE sends the NR RRC messages on PC5 signaling radio bearers (SRBs) over a sidelink broadcast control channel (SBCCH). The RAN can indicate the PC5 AS configuration to remote UE and relay UE independently via NR RRC messages. Changes may be made to NR V2X PC5 stack operation to support radio bearer handling in NR RRC/PDCP but support corresponding logical channels in PC5 link. In L2 relaying, PC5 RLC may need to support interacting with NR PDCP directly.

There are various issues to be addressed with sidelink relay DRX scenarios. One issue relates to support of a remote UE sidelink DRX for relay discovery. One assumption for relay discover in some cases is that the Relay UE is in CONNECTED mode only, rather than IDLE/INACTIVE. A remote UE, may be in a CONNECTED, IDLE/INACTIVE or out of coverage (OOC) modes.

Figure 10A:
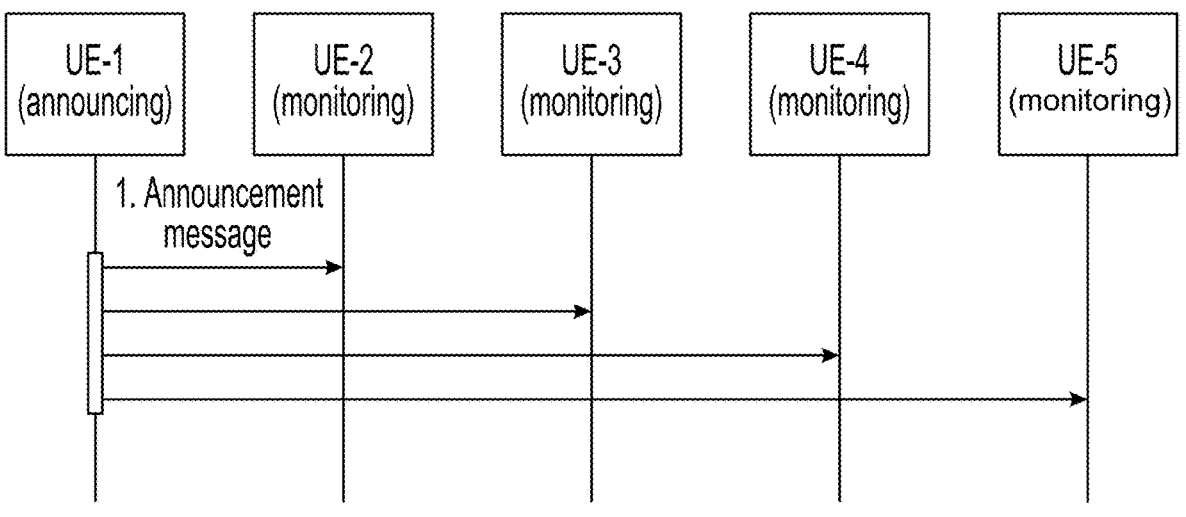
FIGS. 10A and 10B illustrate example relay discovery procedures.
Figure 10B:
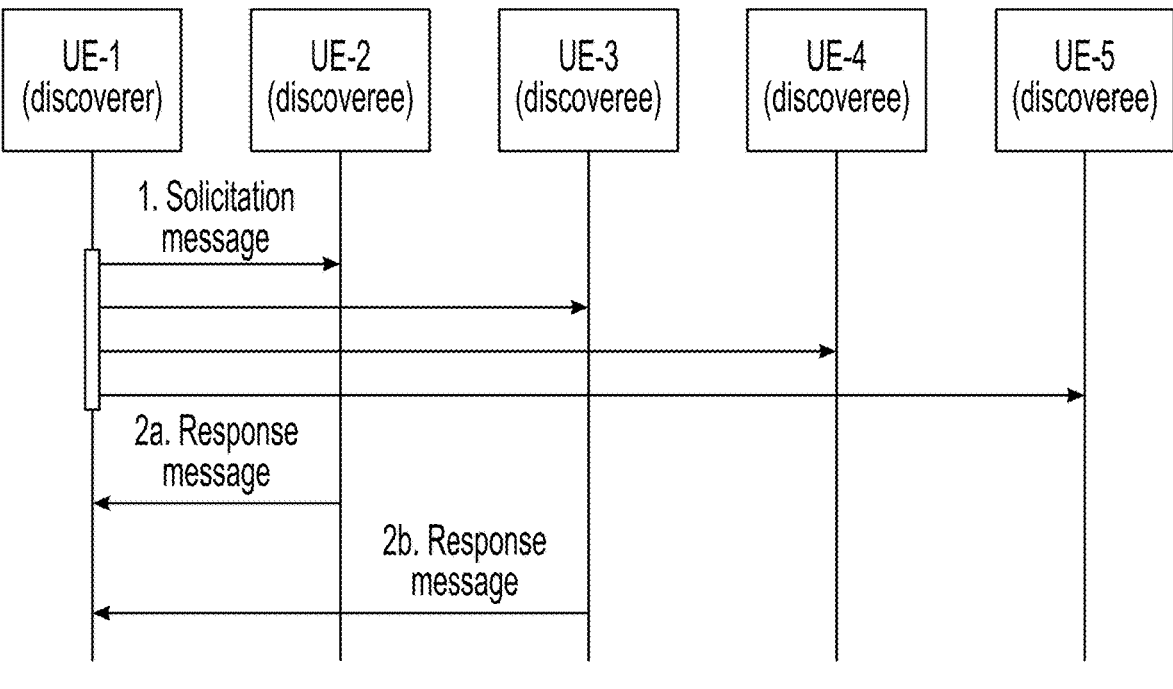

Discovery for both relay selection and reselection may be supported. Different type of discovery models may be supported. For example, a first model (referred to as Model A discovery) is shown in FIG. 10A. In this case, a UE sends discovery messages (an announcement) while other UEs monitor. According to a second model (referred to as Model B discovery) shown in FIG. 10B, a UE (discoverer) sends a solicitation message and waits for responses from monitoring UEs (discoverees). Such discovery messages may be sent on a PC5 communication channel (e.g., and not on separate discovery channel). Discovery messages may be carried within the same layer-2 frames as those used for other direct communication including, for example, the Destination Layer-2 ID that can be set to a unicast, groupcast or broadcast identifier, the Source Layer-2 ID that is always set to a unicast identifier of the transmitter, and the frame type indicates that it is a ProSe Direct Discovery message.

As noted above, for relay selection, the remote UE has not connected to any relay node (i.e. PC5 unicast link is not established between remote UE and relay node). In this case, it may be desirable to design DRX modes to reduce remote UE power consumption on monitoring relay discovery messages for relay selection.

As noted above, for relay reselection, the remote UE has connected to at least one relay node (e.g., with a PC5 unicast established between the emote UE and relay node). For relay reselection, it may be desirable to design a DRX configuration that helps reduce remote UE power consumption while monitoring for relay discovery messages for relay reselection and PC5 data transmission.

Figure 11:
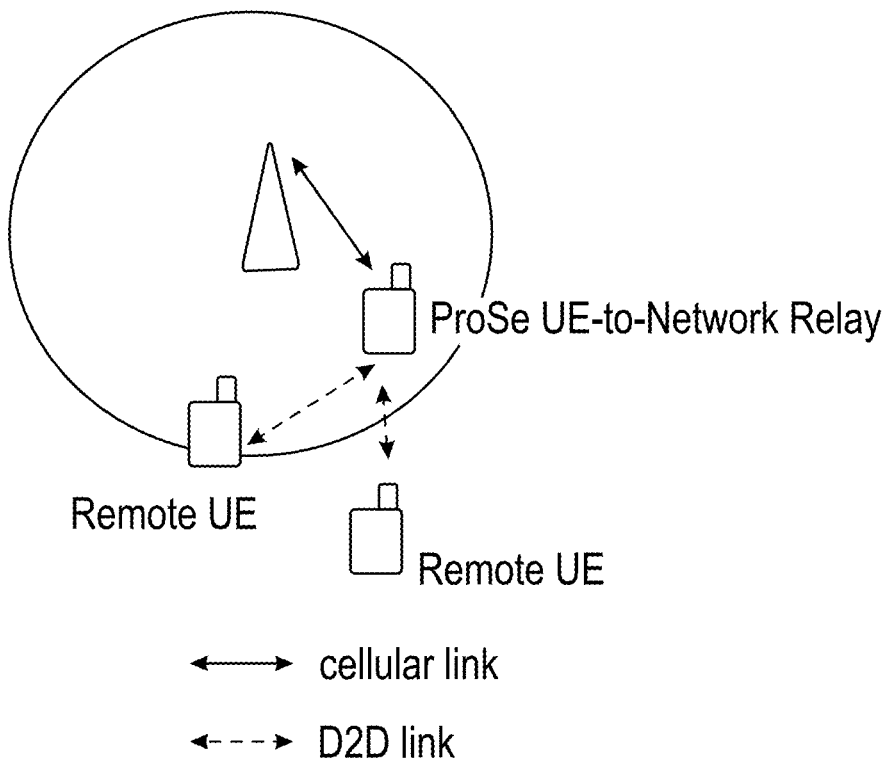
FIG. 11 illustrates an example communications environment in which a relay UE serves one or more remote UEs.

FIG. 11 illustrates an example environment in which remote UEs are served by a network entity through a UE-to-network relay (e.g., a relay UE). To communicate through a relay UE, a remote UE, which has not connected to a relay node, may discover relay nodes and select one or more of the relay nodes as the remote UE's relay. The remote UE may, for example, discover all relay nodes with a sidelink discovery reference signal received power (SD-RSRP) above a first threshold value (e.g., more than min-Hyst above q-Rx-LevMin). The remote UE may also reselect a relay when the remote UE is already connected with a relay node. To do so, the remote UE can determine that the sidelink RSRP (SL-RSRP) is below a second threshold value (e.g., more than minHyst below q-Rx-LevMin), and based on the determination, discover relay nodes having an SD-RSRP above the first threshold value.

Example Paging in Sidelink L3 Relay Systems

Aspects of the present disclosure provide apparatus, methods, processing systems, and computer readable mediums for paging in sidelink L2 relay systems. As will be described, the techniques may enable a remote UE to receive paging from a network entity directly or through a relay UE using a layer 2 relay.

Figure 12A:
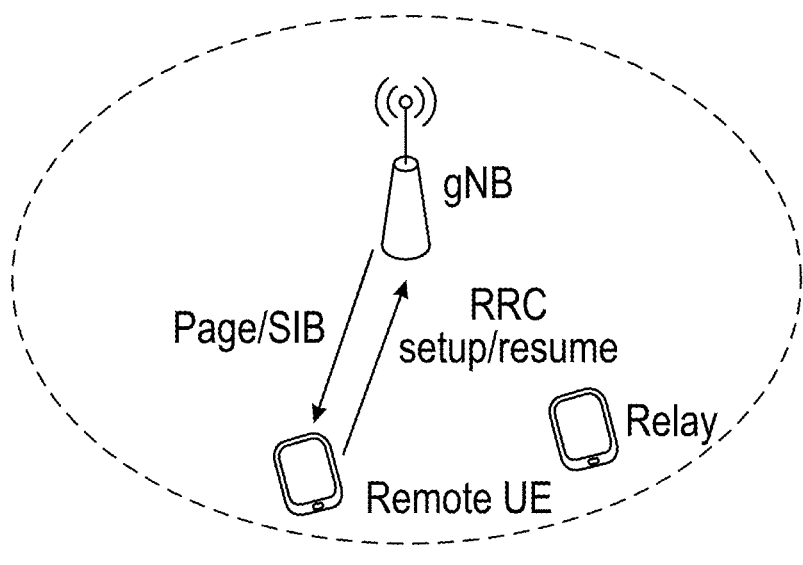
FIGS. 12A and 12B illustrate example scenarios in which a remote UE receives paging and system information blocks based on whether the remote UE is in or out of coverage of a network entity.
Figure 12B:
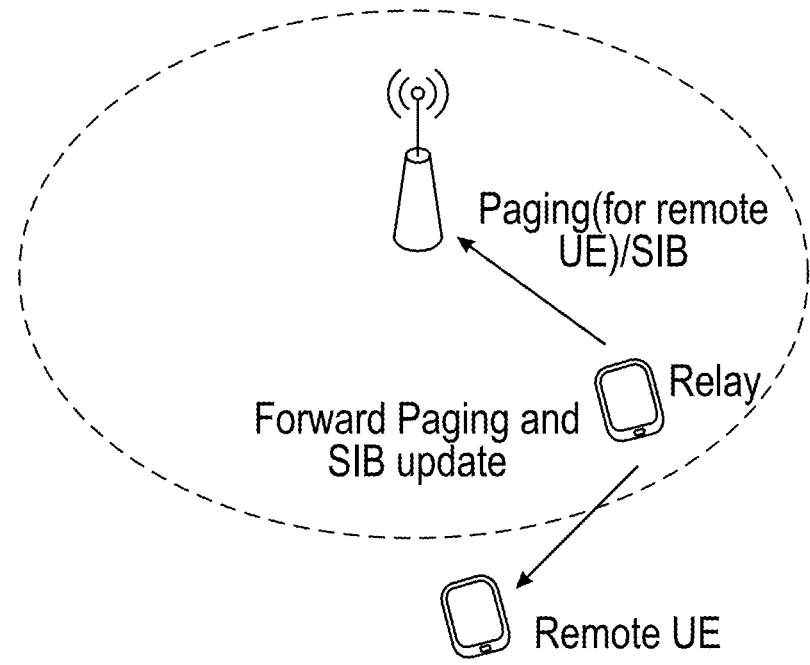

FIGS. 12A and 12B illustrate example scenarios in which a UE communicates with a network entity (e.g., a gNB). In both scenarios illustrated in FIGS. 12A and 12B, the relay UE is in coverage, and in one of an RRC Idle, Inactive, or Connected state. In the scenario illustrated in FIG. 12A, the remote UE is in coverage of the network entity. Because the remote UE is in coverage, the remote UE can receive paging and system information blocks (SIBs) directly from the network entity via the Uu link. However, in the scenario illustrated in FIG. 12B, the remote UE may be out of coverage of the network entity. Because the remote UE is out of coverage, and the relay UE is in coverage, the remote UE may connect with the relay UE and receive paging and SIBs from the network entity via the relay UE.

Figures 13, 14:
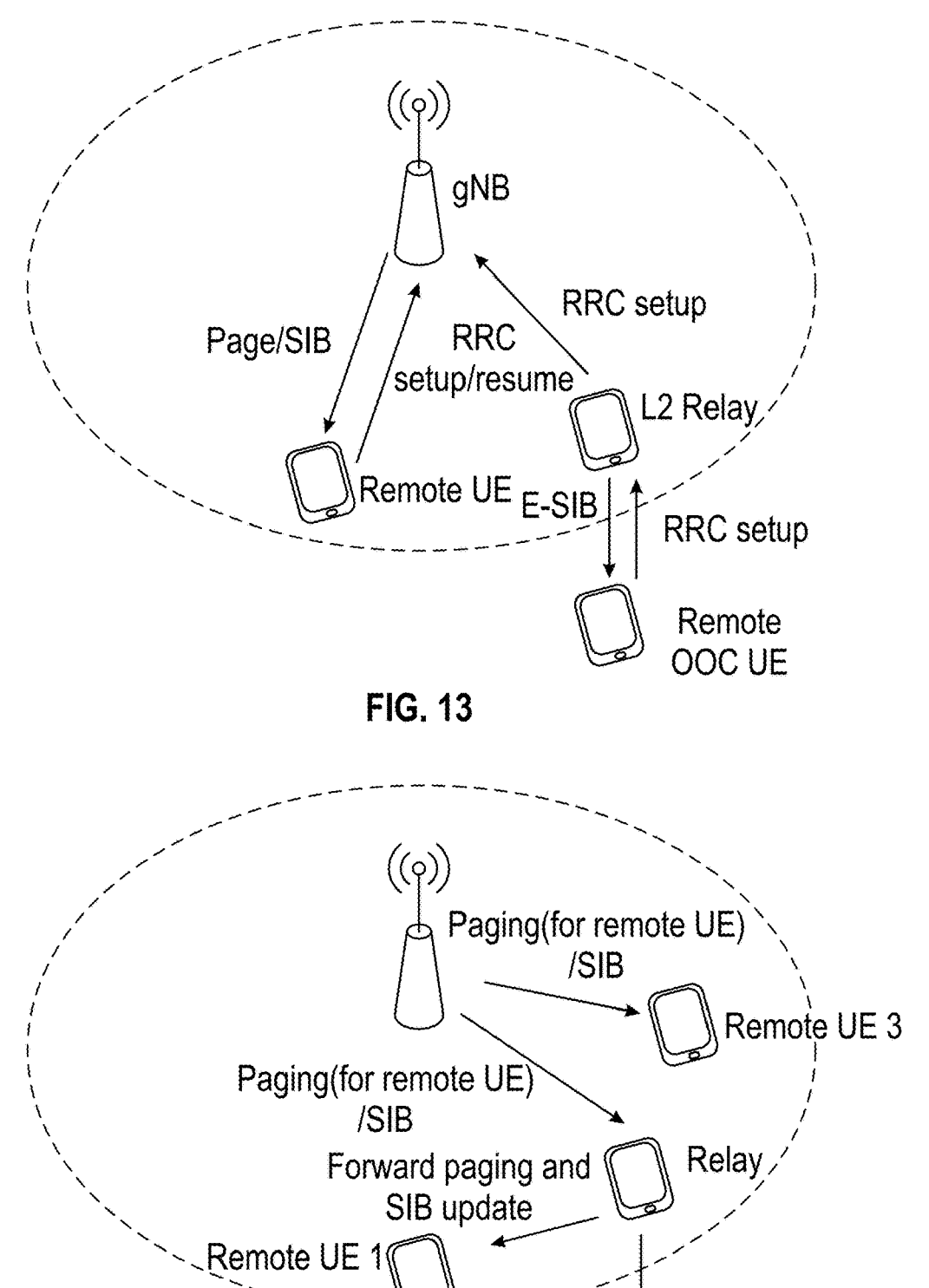
FIG. 13 illustrates example connection paths of a remote UE and paging prior to connecting with a relay.
FIG. 14 illustrates example connection paths between remote UEs and relays after remote UEs connect with a relay.

FIG. 13 illustrates an example of paging by a remote UE prior to connecting with a relay UE. Before the remote UE connects with the relay UE, the UE may follow UE Idle or Inactive behavior as would be used were a remote UE connecting with a network entity. For example, the UE may perform idle mode measurements and cell (re)selection. Upon reception of Uu paging from a network entity, the UE can trigger unified access control (UAC) and radio resource configuration (RRC) setup or resumption, and can monitor the Uu connection for SIB updates. Remote UEs within coverage of a network entity may receive paging from the network entity; however, remote UEs outside of coverage of the network entity that are not connected with an in-coverage relay may not be able to receive paging and SIBs from the network entity.

FIG. 14 illustrates an example of paging by a remote UE after connecting with a relay (e.g., after a PC5 RRC connection is established). The remote UE can be configured by a gNB in one of a plurality of paging modes. In direct paging, a remote UE may monitor Uu paging and SIB updates. Direct paging may be a default mode that a remote UE applies if no signaling is received that indicates the paging mode to be used by the UE. Forward paging may allow the remote UE to forego monitoring for Uu paging or SIB updates; the relay UE, instead, monitors the remote UE's paging and forwards the remote UE's paging to the remote UE. Adaptive paging may allow for switching between direct and forward paging based on a request by the remote UE. Finally, a remote UE can be configured in a no-paging mode in which neither the remote UE nor the relay UE monitors Uu paging and/or SIB updates for the remote UE. Generally, the remote paging mode may be configured on a per-remote-UE basis, as illustrated in FIG.

14. For example, remote UE 3 may directly monitor Uu paging, while remote UEs 1 and 2, which are connected with the relay UE, may rely on paging forwarding.

Figure 15:
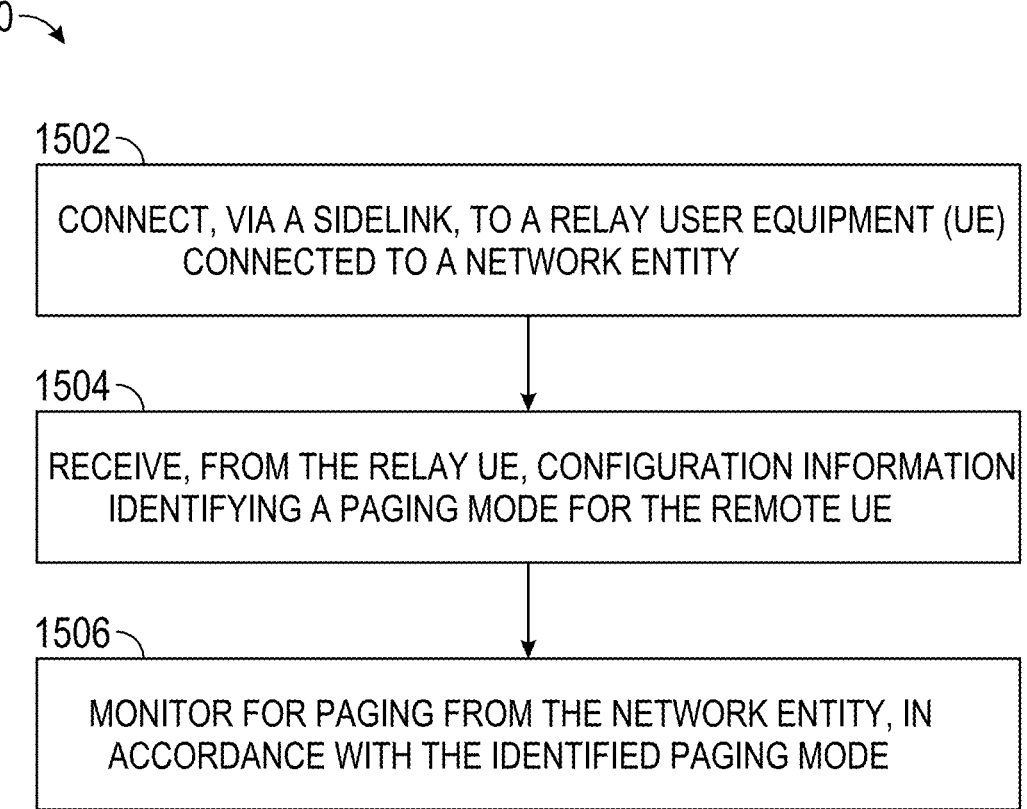
FIG. 15 is a flow diagram illustrating example operations that may be performed by a remote UE, in accordance with certain aspects of the present disclosure.
Figure 17:
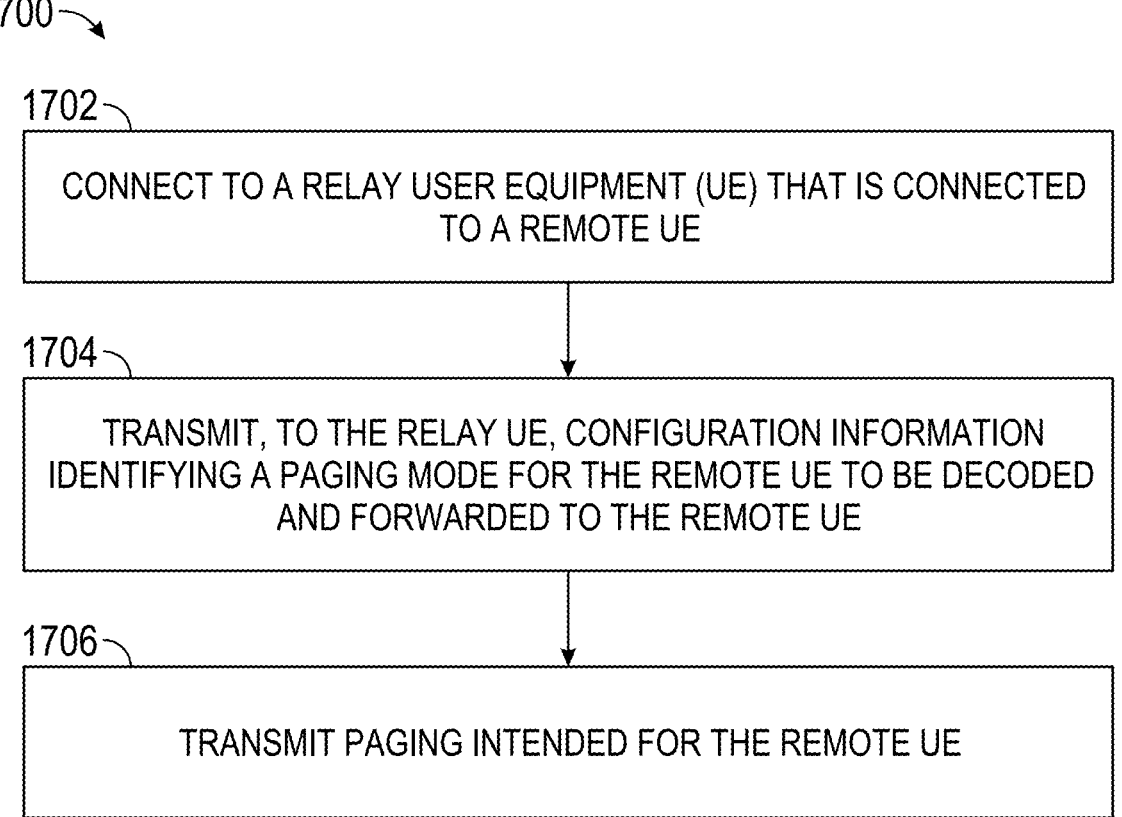
FIG. 17 is a flow diagram illustrating example operations that may be performed by a network entity, in accordance with certain aspects of the present disclosure.

Aspects of the present disclosure may allow for remote UEs to be configured for remote paging in sidelink L3 relay systems. FIGS. 15, 16, and 17 illustrate example operations from the perspective of a remote UE, relay UE, and network entity, respectively, for remote paging in sidelink L3 relay systems.

FIG. 15 illustrates example operations 1500 that may be performed by a remote UE to receive paging in a sidelink L2 relay system. As illustrated, operations 1500 begin at block 1502, where the remote UE connects, via a sideline, to a relay user equipment (UE) connected to a network entity.

At block 1504, the remote UE receives, from the relay UE, configuration information identifying a paging mode for the remote UE.

At block 1506, the remote UE monitors for paging from the network entity, in accordance with the identified paging mode.

FIG. 16 illustrates example operations 1600 that may be performed by a relay UE to receive paging in a sidelink L2 relay system and forward paging to a remote UE connected to the relay UE. As illustrated, operations 1600 may begin at block 1602, where the relay UE connects, via a sidelink, to a remote user equipment (UE) while the relay UE is also connected to a network entity.

At block 1604, the relay UE receives, from the network entity, configuration information identifying a paging mode for the remote UE.

At block 1606, the relay UE forwards the configuration information to the remote UE in a sidelink message.

At block 1608, the relay UE monitors for paging from the network entity for the remote UE, in accordance with the identified paging mode for the remote UE.

FIG. 17 illustrates example operations that may be performed by a network entity to configure a relay UE and a remote UE for paging in a sidelink L2 relay system. As illustrated, operations 700 may begin at block 1702, where the network entity connects to a relay user equipment (UE) that is connected to a remote UE.

At block 1704, the network entity transmits, to the relay UE, configuration information identifying a paging mode for the remote UE to be decoded and forwarded to the remote UE.

At block 1706, the network entity transmits paging intended for the remote UE.

Figures 18, 19:
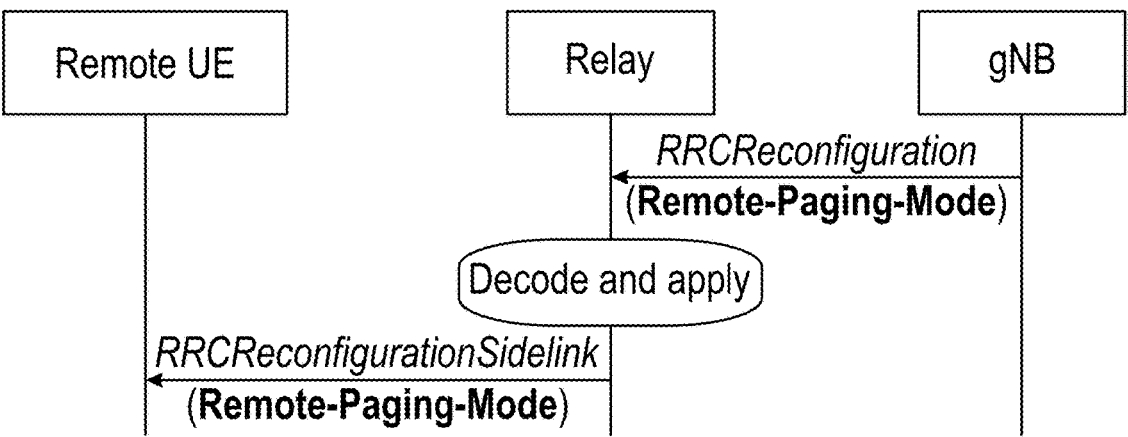
FIG. 18 is a call flow diagram illustrating example messages that may be passed between a remote UE, a relay UE, and a network entity to signal a remote UE paging mode configuration, in accordance with certain aspects of the present disclosure.
FIG. 19 illustrates paging configurations that may be used for different combinations of remote UE and relay UE state, in accordance with certain aspects of the present disclosure.

As discussed, a remote UE may be configured to be in one of a plurality of remote paging modes after the relay UE connects to a relay UE. FIG. 18 illustrates an example of messages exchanged between a remote UE, a relay UE, and a network entity (e.g., a gNB) to configure the remote UE for paging in a sidelink L2 relay system. As illustrated, to configure the remote UE, the network entity can transmit an RRC reconfiguration message to the relay UE including information identifying a remote paging mode for the UE. The remote paging mode, in some aspects, may include one of direct paging, forward paging, or no paging. The relay UE may decode the RRC reconfiguration message and apply the remote paging mode to the relay UE, and transmit a sidelink RRC reconfiguration message to the remote UE including the remote paging mode decoded from the RRC reconfiguration message received from the network entity.

FIG. 19 is a table illustrating relationships between RRC states and remote paging modes in a sidelink L3 relay system. Generally, the remote UE may not use L3 relaying while the remote UE is in RRC INACTIVE mode because the remote UE context is not stored at a network entity. Generally, in some Uu RRC state combinations, one remote paging mode may be configured, and for other Uu RRC state combinations, multiple or no paging modes may be configured.

As illustrated, where both the remote UE and the relay UE are in RRC IDLE, the remote paging mode may be direct paging or forward paging, based on a selection by the network entity. Where the remote UE is in RRC IDLE mode and the relay UE is in RRC INACTIVE mode, the remote paging mode may be direct paging, with radio access network (RAN) paging for the relay UE and core network (CN) paging for the remote UE. In some aspects, paging may not be supported when the remote UE is in RRC IDLE mode and the relay UE is in RRC CONNECTED mode, as the remote UE may be deemed to be in RRC CONNECTED mode by the network entity when the relay UE is in RRC CONNECTED mode.

Where the remote UE is in RRC CONNECTED mode, there may be no paging configurations that are valid if the relay UE is in RRC IDLE or RRC INACTIVE mode. If the remote UE and the relay UE are both in RRC CONNECTED mode, paging may not be needed. The relay may forward SIBs upon reception of paging for SIB updates.

In some aspects, the remote UE may be configured with direct paging as the paging mode. In such a case, the remote UE may monitor Uu paging and SIB updates, and the relay UE need not monitor paging for the remote UE. When the UE is configured with direct paging as the paging mode, and the remote UE moves out of coverage, the UE may attempt to perform cell reselection if there are any suitable cells that the UE can camp on (e.g., cells having a received power or other signal strength metric above a threshold value). Otherwise, the UE may transition to an out-of-coverage mode in which the UE does not monitor for Uu paging or SIB updates and instead uses preconfigured parameters for communications within the network.

In some aspects, the remote UE may be configured with forward paging as the paging mode. In the forward paging mode, the remote UE need not monitor Uu paging or for SIB updates from the network entity. The relay UE may aid the remote UE in monitoring for Uu paging and/or SIB updates and may forward paging and/or SIB updates to the remote UE. Forward paging may work when the remote UE is in coverage of the network entity or out of coverage of the network entity and may work in the RRC IDLE, INACTIVE, and CONNECTED states.

Figure 20A:
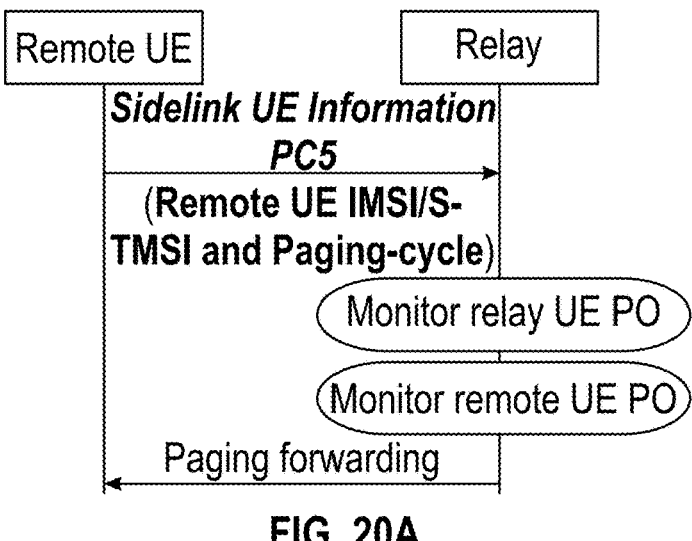
FIGS. 20A-20C are call flow diagrams illustrating example messages that may be passed between a remote UE, a relay UE, and a network entity for forward paging of communications for the remote UE, in accordance with certain aspects of the present disclosure.
Figure 20B:
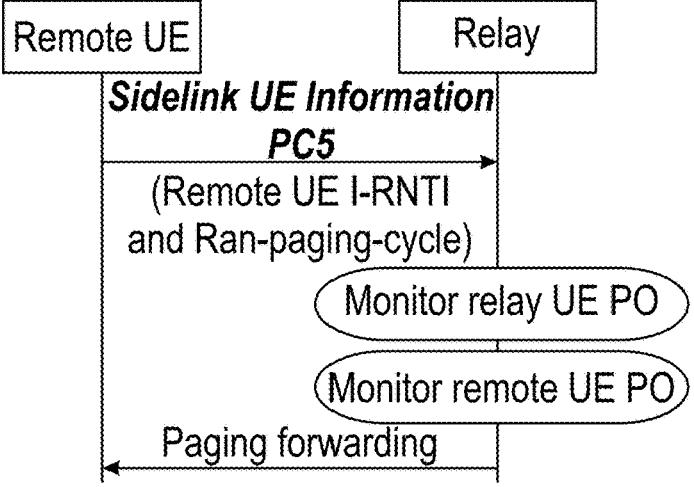
Figure 20C:
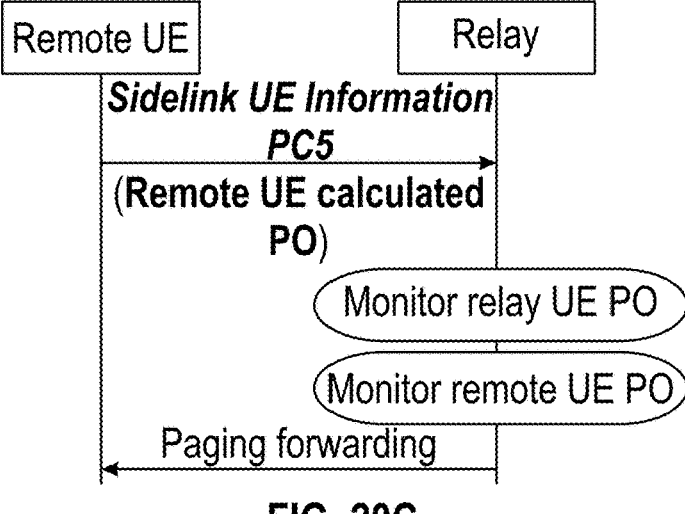

FIGS. 20A-20C illustrate example scenarios in which a relay UE and a remote UE are separately paged, such that the relay UE monitors the remote UE's paging opportunities.

As illustrated in FIG. 20A, the remote UE may be in RRC IDLE mode, and the relay UE may be configured to monitor the remote UE's paging occasions based on the remote UE's identifier. To do so, the remote UE may transmit information that the relay UE can use to calculate the remote UE's paging occasions in a sidelink message. For example, the remote UE can transmit information related to the international mobile subscriber identifier (IMSI) or serving temporary mobile subscriber identity (S-TMSI) and paging cycle information to the relay UE in a SidelinkUEInformationPC5 message. The information related to the IMSI or S-TMSI may be the full IMSI or S-TMSI, a portion of the IMSI or S-TMSI, or a hash of the IMSI or S-TMSI. The relay UE can calculate the remote UE's paging occasions based on the UE IMSI and/or S-TMSI and monitor both the relay UE paging occasions and the remote UE paging occasions. When paging and/or SIB updates are received from the network entity in the remote UE paging occasions, the relay UE can forward the paging and/or SIB updates to the remote UE.

As illustrated in FIG. 20B, the remote UE may be in RRC INACTIVE mode, and the UE may be configured to monitor the remote UE's paging occasions based on the remote UE's identifier. In this example, the remote UE may transmit information related to an inactive radio network temporary identifier (I-RNTI) and paging cycle information to the relay UE for the relay UE to identify the remote UE's paging occasions. The information related to the I-RNTI may be the full I-RNTI, a portion of the I-RNTI, or a hash of the I-RNTI. As in FIG. 20A, the relay UE may monitor paging occasions for both the relay UE and the remote UE, and when paging and/or SIB updates are received from the network entity in the remote UE paging occasions, the relay UE can forward the paging and/or SIB updates to the remote UE.

In another example, as illustrated in FIG. 20C, the remote UE may determine its paging occasions and provide that information to the relay UE. The remote UE-calculated paging occasion information may be transmitted to the relay UE in a sidelink message (e.g., SidelinkUEInformationPC5). The relay UE may monitor paging occasions for both the relay UE and the remote UE, and when paging and/or SIB updates are received from the network entity in the remote UE paging occasions, the relay UE can forward the paging and/or SIB updates to the remote UE.

Figure 21:
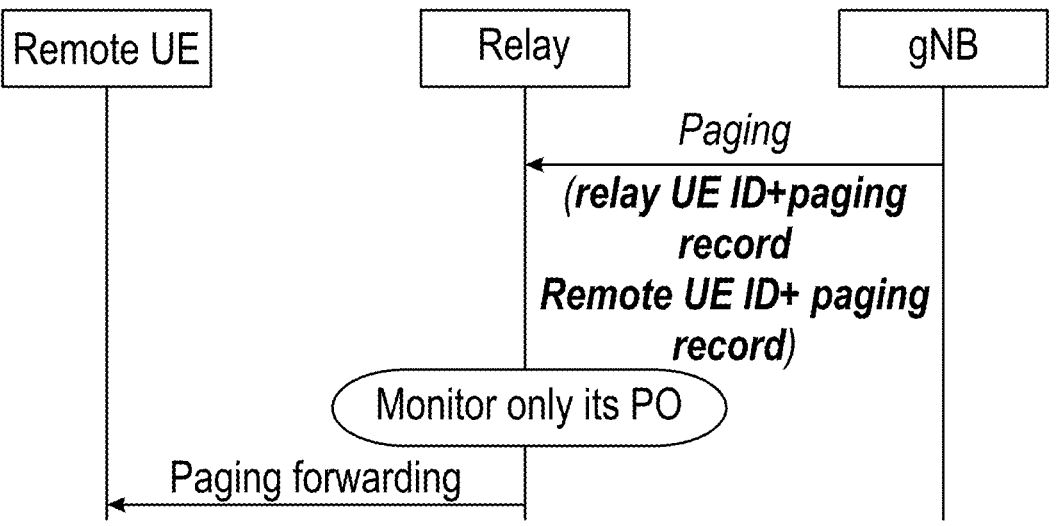
FIG. 21 is a call flow diagram illustrating behavior of a relay UE for forward paging of communications for a remote UE, in accordance with certain aspects of the present disclosure.

In some aspects, aggregated paging may be supported, in which paging for both the relay UE and the remote UE are combined into a single message from the network entity. FIG. 21 illustrates an example scenario in which aggregated paging is supported. In this scenario, paging for the relay UE and the remote UE may be aggregated and sent by the network entity during the paging occasions associated with the relay UE, with each paging record being associated with an identifier of the intended destination UE. When the relay UE receives paging records associated with an identifier of the remote UE, the relay UE may forward those pages to the remote UE. Because paging may be sent during paging occasions associated with the relay UE, the remote UE and relay UE need not exchange paging occasion information and may provide for reduced power consumption at the relay UE, since the relay UE may not need to be active for paging occasions other than those associated with the relay UE.

Figure 22:
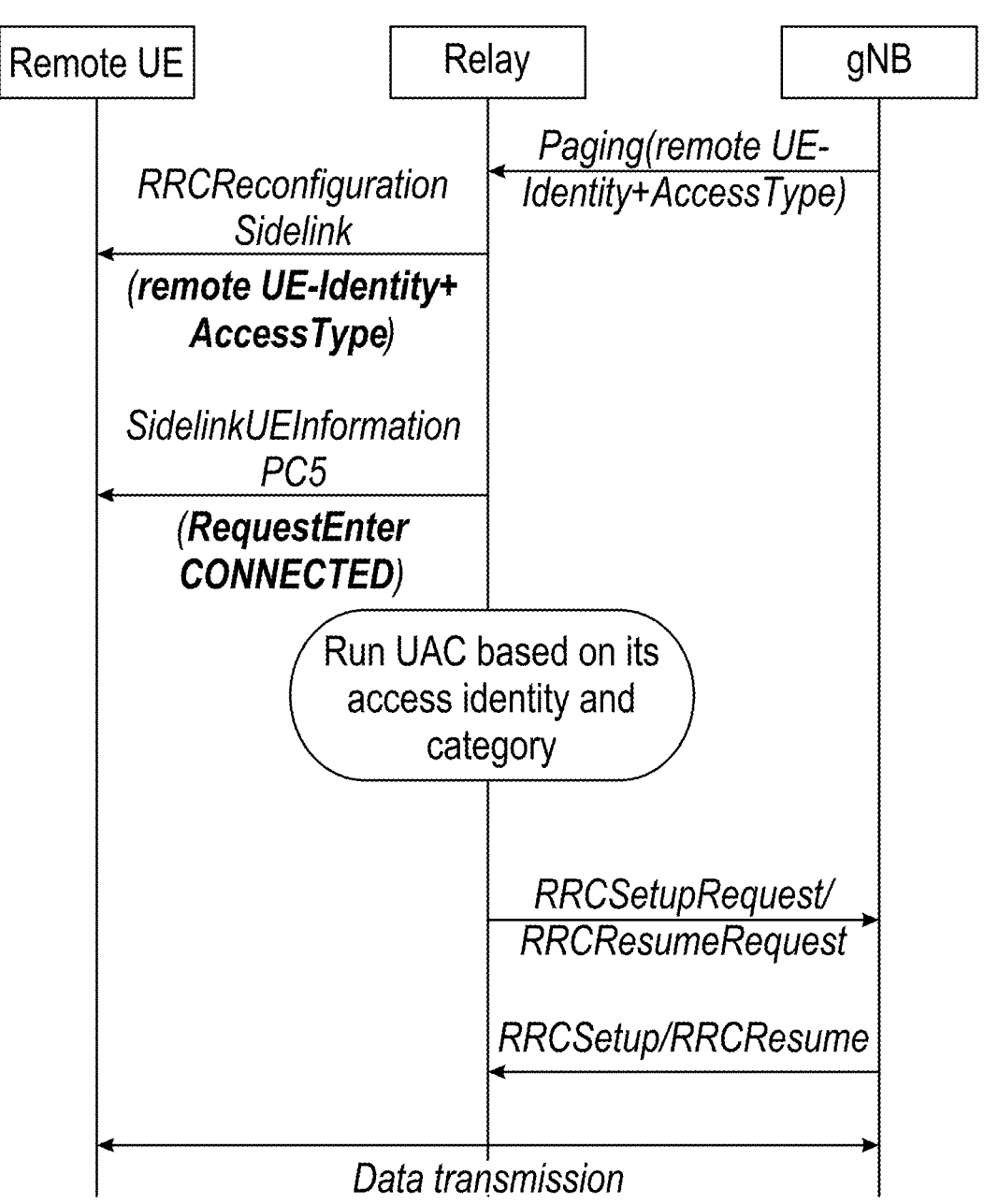
FIG. 22 is a call flow diagram illustrating example messages that may be exchanged between a remote UE, a relay UE, and a network entity for forward signaling for dedicated data in an L2 relay procedure, in accordance with certain aspects of the present disclosure.

In some aspects, forward paging may be used with forward signaling for dedicated data in L3 relay scenarios. As illustrated in FIG. 22, the relay UE may receive paging data from the network entity including a UE identity and access type associated with the remote UE. The relay UE may transmit a sidelink RRC Reconfiguration message to the remote UE including the UE identity and access type associated with the UE, and in response, the relay UE may receive a sidelink message with a request to enter the RRC CONNECTED state. The sidelink message may be, for example, a SidelinkUEInformationPC5 message. In response to receiving the sidelink message, the relay UE may perform an access control procedure (e.g., unified access control (UAC)) based on the access identity and access category associated with the relay UE and transmit an RRC setup request or RRC resume request message to the network entity. After establishing or resuming a connection with the network entity, relay UE can receive an RRC Setup of RRC Resume message from the network entity, and the network entity can initiate direct data transmissions between the gNB and the remote UE.

Generally, in L3 relay scenarios, a remote UE need not perform tracking area update (TAU) procedures. The remote UE may not need to perform TAU procedures, for example, because the tracking area of the remote UE may be regarded as the tracking area of the relay UE.

Figure 23:
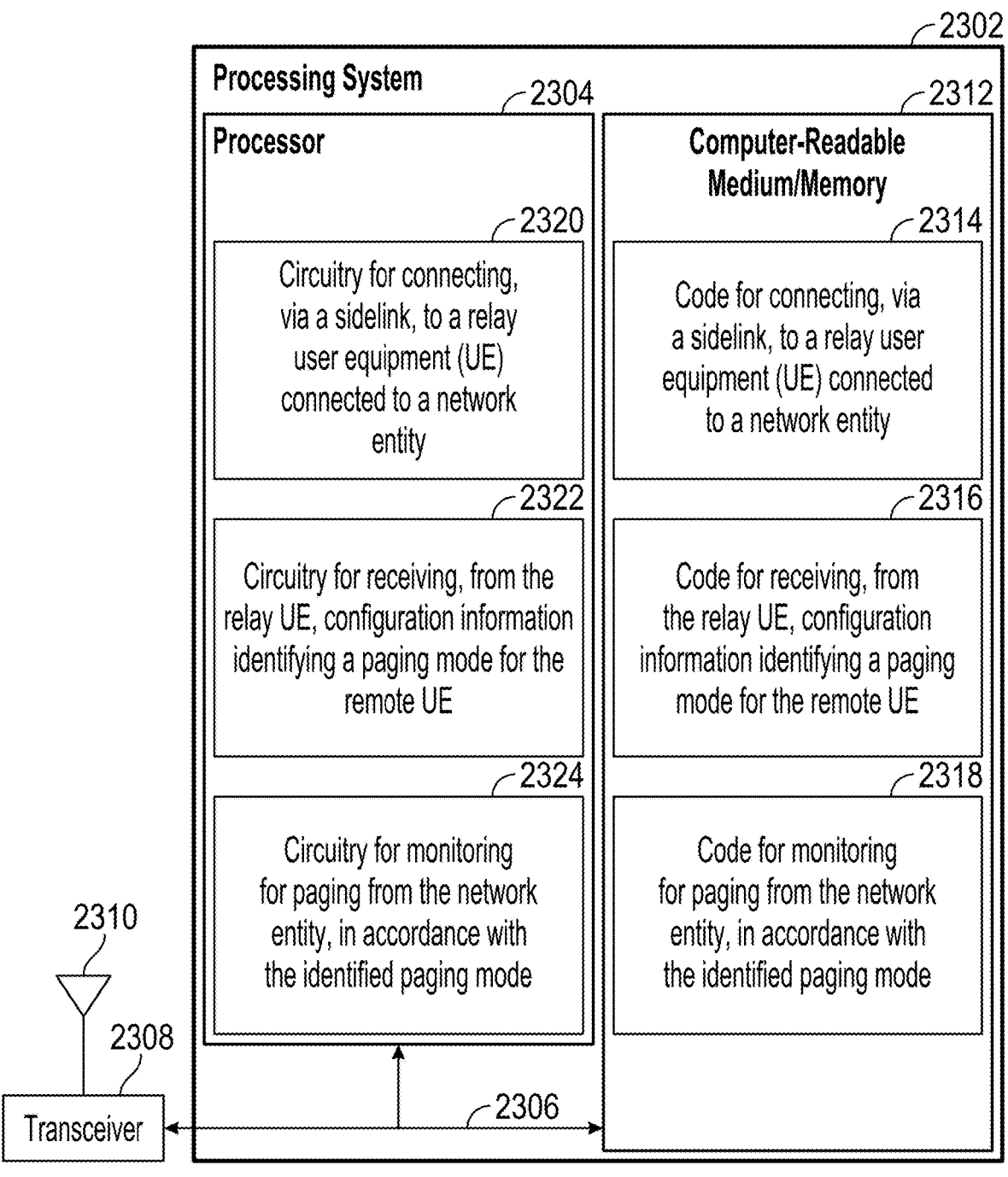
FIG. 23 illustrates a communications device that may include various components configured to perform the operations illustrated in FIG. 15, in accordance with certain aspects of the present disclosure.

FIG. 23 illustrates a communications device 2300 that may include various components (e.g., corresponding to means-plus-function components) configured to perform operations for the techniques disclosed herein, such as the operations illustrated in FIG. 15. The communications device 2300 includes a processing system 2302 coupled to a transceiver 2308. The transceiver 2308 is configured to transmit and receive signals for the communications device 2300 via an antenna 2310, such as the various signals as described herein. The processing system 2302 may be configured to perform processing functions for the communications device 2300, including processing signals received and/or to be transmitted by the communications device 2300.

The processing system 2302 includes a processor 2304 coupled to a computer-readable medium/memory 2312 via a bus 2306. In certain aspects, the computer-readable medium/memory 2312 is configured to store instructions (e.g., computer-executable code) that when executed by the processor 2304, cause the processor 2304 to perform the operations illustrated in FIG. 15, or other operations for receiving paging in a sidelink L3 relay system. In certain aspects, computer-readable medium/memory 2312 stores code 2314 for connecting, via a sidelink, to a relay user equipment (UE) connected to a network entity; code 2316 for receiving, from the relay UE, configuration information identifying a paging mode for the remote UE; and code 2318 for monitoring for paging from the network entity, in accordance with the identified paging mode. In certain aspects, the processor 2304 has circuitry configured to implement the code stored in the computer-readable medium/memory 2312. The processor 2304 includes circuitry 2320 for connecting, via a sidelink, to a relay user equipment (UE) connected to a network entity; circuitry 2322 for receiving, from the relay UE, configuration information identifying a paging mode for the remote UE; and circuitry 2324 for monitoring for paging from the network entity, in accordance with the identified paging mode.

FIG. 24 illustrates a communications device 2400 that may include various components (e.g., corresponding to means-plus-function components) configured to perform operations for the techniques disclosed herein, such as the operations illustrated in FIG. 16. The communications device 2400 includes a processing system 2402 coupled to a transceiver 2408. The transceiver 2408 is configured to transmit and receive signals for the communications device 2400 via an antenna 2410, such as the various signals as described herein. The processing system 2402 may be configured to perform processing functions for the communications device 2400, including processing signals received and/or to be transmitted by the communications device 2400.

The processing system 2402 includes a processor 2404 coupled to a computer-readable medium/memory 2412 via a bus 2406. In certain aspects, the computer-readable medium/memory 2412 is configured to store instructions (e.g., computer-executable code) that when executed by the processor 2404, cause the processor 2404 to perform the operations illustrated in FIG. 16, or other operations for configuring a remote UE for paging in sidelink L2 relay scenarios and handing paged data at a relay UE in sidelink L3 relay scenarios. In certain aspects, computer-readable medium/ memory 2412 stores code 2414 for connecting, via a sidelink, to a remote user equipment (UE) while the relay UE is also connected to a network entity; code 2416 for receiving, from the network entity, configuration information identifying a paging mode for the remote UE; code 2418 for forwarding the configuration information to the remote UE; and code 2420 for monitoring for paging from the network entity for the remote UE, in accordance with the identified paging mode for the remote UE. In certain aspects, the processor 2404 has circuitry configured to implement the code stored in the computer-readable medium/memory 2412. The processor 2404 includes circuitry 2422 for connecting, via a sidelink, to a remote user equipment (UE) while the relay UE is also connected to a network entity; circuitry 2424 for receiving, from the network entity, configuration information identifying a paging mode for the remote UE; circuitry 2426 for forwarding the configuration information to the remote UE; and circuitry 2428 for monitoring for paging from the network entity for the remote UE, in accordance with the identified paging mode for the remote UE.

Figure 25:
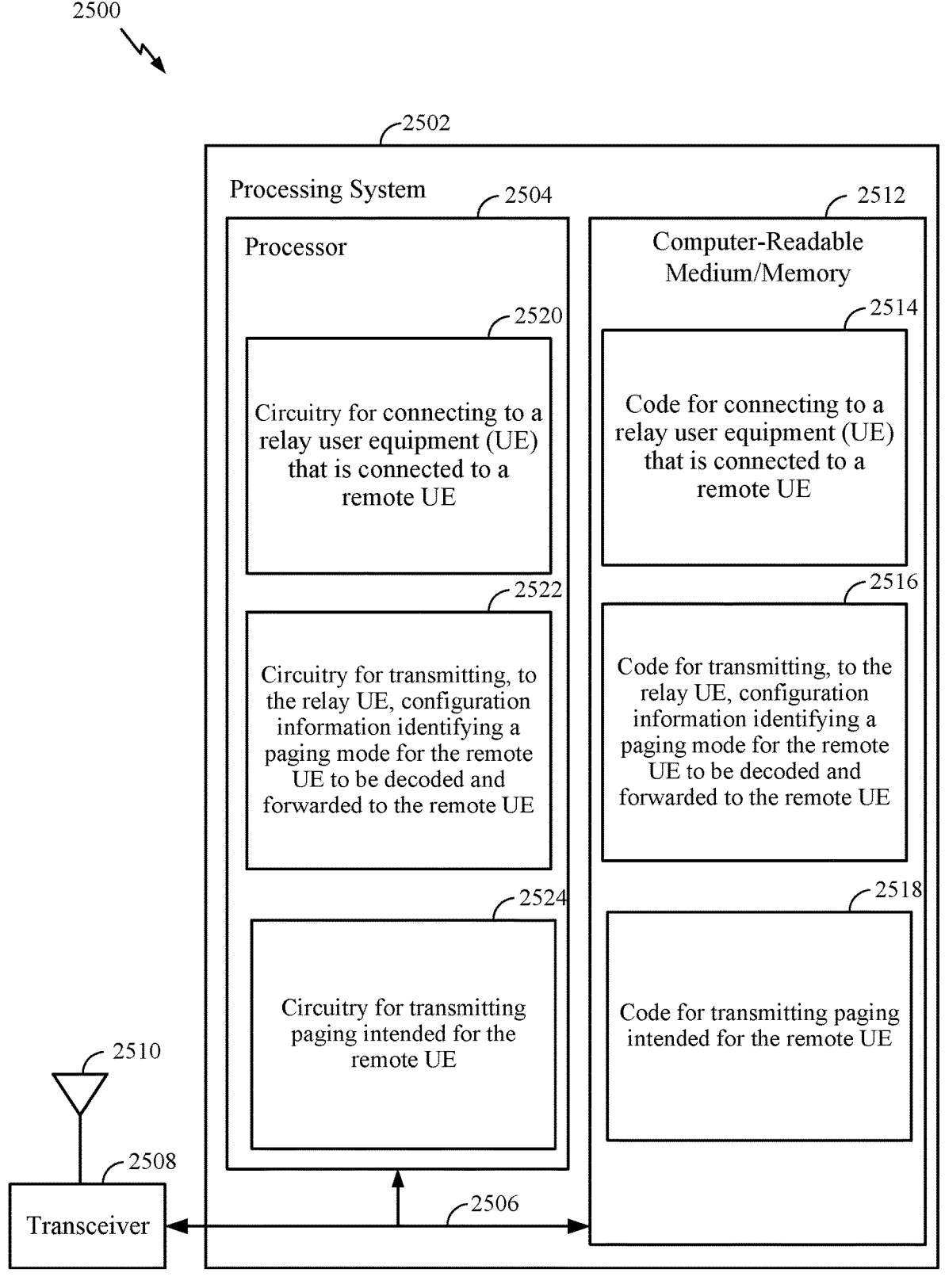
FIG. 25 illustrates a communications device that may include various components configured to perform the operations illustrated in FIG. 17, in accordance with certain aspects of the present disclosure.

FIG. 25 illustrates a communications device 2500 that may include various components (e.g., corresponding to means-plus-function components) configured to perform operations for the techniques disclosed herein, such as the operations illustrated in FIG. 17. The communications device 2500 includes a processing system 2502 coupled to a transceiver 2508. The transceiver 2508 is configured to transmit and receive signals for the communications device 2500 via an antenna 2510, such as the various signals as described herein. The processing system 2502 may be configured to perform processing functions for the communications device 2500, including processing signals received and/or to be transmitted by the communications device 2500.

The processing system 2502 includes a processor 2504 coupled to a computer-readable medium/memory 2512 via a bus 2506. In certain aspects, the computer-readable medium/memory 2512 is configured to store instructions (e.g., computer-executable code) that when executed by the processor 2504, cause the processor 2504 to perform the operations illustrated in FIG. 17, or other operations for configuring a remote UE and a remote UE for paging in a sidelink L3 relay scenario. In certain aspects, computer-readable medium/memory 2512 stores code 2514 for connecting to a relay user equipment (UE) that is connected to a remote UE; code 2516 for transmitting, to the relay UE, configuration information identifying a paging mode for the remote UE to be decoded and forwarded to the remote UE; and code 2518 for transmitting paging intended for the remote UE. In certain aspects, the processor 2504 has circuitry configured to implement the code stored in the computer-readable medium/memory 2512. The processor 2504 includes circuitry 2520 for connecting to a relay user equipment (UE) that is connected to a remote UE; circuitry 2522 for transmitting, to the relay UE, configuration information identifying a paging mode for the remote UE to be decoded and forward to the remote UE; and circuitry 2524 for transmitting paging intended for the remote UE.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIGS. 15, 16, and 17 may be performed by various processors shown in FIG. 4, such as processors 466, 458, 464, and/or controller/processor 480 of the UE 120*a*.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 15, 16, and 17.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a remote user equipment (UE), comprising:

connecting, via a sidelink, to a relay user equipment (UE) connected to a network entity;

receiving, from a network entity via the relay UE, configuration information identifying a paging mode for the remote UE;

calculating paging occasion information for the remote UE and transmitting the calculated paging occasion information to the relay UE, when the paging mode comprises forward paging; and monitoring for paging from the network entity, in accordance with the identified paging mode.

2. The method of claim 1, wherein the configuration information is received via a radio resource control (RRC) reconfiguration message.

3. The method of claim 1, wherein:

the paging mode comprises direct paging, and monitoring for the paging includes monitoring Uu paging for the remote UE in one or more system information blocks (SIBs).

4. The method of claim 3, further comprising:

determining that the remote UE has moved out of coverage of the network entity;

determining that no cells are suitable for cell reselection; and transitioning to an out of coverage mode based on determining that no cells are suitable for cell reselection.

5. The method of claim 1, wherein:

the paging mode comprises forward paging, and monitoring for the paging includes receiving, from the relay UE, forwarded paging and system information block (SIB) updates.

6. The method of claim 5, further comprising: transmitting, to the relay UE, information associated with a paging occasion for the remote UE, wherein the paging and SIB updates are received based on the information associated with the paging occasion for the remote UE.

7. The method of claim 6, wherein the remote UE is in an idle mode, and the information associated with the paging occasion comprises a subscriber identity associated with the remote UE and paging cycle information for the remote UE.

8. The method of claim 6, wherein the remote UE is an inactive mode, and the information associated with the paging occasion comprises information related to an inactive radio network temporary identifier (I-RNTI) and radio access network (RAN) paging cycle information associated with the UE.

9. The method of claim 5, wherein monitoring for the paging includes receiving forwarded paging from the relay UE in a paging occasion other than a paging occasion associated with the remote UE.

10. The method of claim 5, further comprising:

receiving, from the relay UE, a message including identity and access type information; and transmitting, to the relay UE, a request to enter connected mode to trigger the relay UE to perform an access control operation; and performing data transmissions with the network entity subsequent to transmitting the request to enter connected mode to the relay UE, wherein the message including identity and access type information comprises a sidelink radio resource control (RRC) reconfiguration message and the request to enter connected mode is carried in a sidelink UE information PC5 message.

11. The method of claim 1, wherein the remote UE is in an idle mode, and wherein the remote UE is configured to refrain from triggering a tracking area update procedure.

12. The method of claim 1, wherein the remote UE is in an idle mode, and wherein the remote UE shares a tracking area (TA) with the relay UE.

13. A method for wireless communications by a relay user equipment (UE), comprising:

connecting, via a sidelink, to a remote user equipment (UE) while the relay UE is also connected to a network entity;

receiving, from the network entity, configuration information identifying a paging mode for the remote UE;

forwarding the configuration information to the remote UE;

monitoring for paging from the network entity for the remote UE, in accordance with the identified paging mode for the remote UE; and receiving calculated paging occasion information for the remote UE and forwarding paging to the remote UE based on the calculated paging occasion information, when the paging mode comprises forward paging.

14. The method of claim 13, wherein:

the paging mode comprises forward paging, and monitoring for paging from the network entity for the remote UE comprises receiving, from the network entity, paging and system information block (SIB) updates to be forwarded to the remote UE.

15. The method of claim 14, further comprising:

receiving, from the remote UE, information associated with a paging occasion for the remote UE; and forwarding, to the remote UE, paging and SIB updates based on the information associated with the paging occasion for the remote UE.

16. The method of claim 15, wherein the remote UE is in an idle mode, and the information associated with the paging occasion comprises a subscriber identity associated with the remote UE and paging cycle information for the remote UE.

17. The method of claim 15, wherein the remote UE is an inactive mode, and the information associated with the paging occasion comprises information related to an inactive radio network temporary identifier (I-RNTI) and radio access network (RAN) paging cycle information associated with the UE.

18. The method of claim 14, wherein monitoring for paging from the network entity for the remote UE comprises:

receiving, from the network entity, aggregated paging for the relay UE and paging for the remote UE in a paging occasion associated with the relay UE; and forwarding, to the remote UE, the paging for the remote UE in a paging occasion other than a paging occasion associated with the remote UE.

19. The method of claim 18, wherein the aggregated paging includes a relay UE identifier and a remote UE identifier, and each page in the aggregated paging is associated with one of the relay UE identifier or the remote UE identifier.

20. The method of claim 14, further comprising:

transmitting, to the remote UE, a message including identity and access type information;

receiving, from the remote UE, a request for the remote UE to enter connected mode in response to the message including identity and access type information; and performing an access control operation in response to receiving the request, wherein the message including identity and access type information comprises a sidelink radio resource control (RRC) reconfiguration message and the request to enter connected mode is carried in a sidelink UE information PC5 message.

21. The method of claim 20, wherein the access control operation is performed based on an access identity and access category of the relay UE.

22. A method for wireless communications by a network entity, comprising:

connecting to a relay user equipment (UE) that is connected to a remote UE;

transmitting, to the relay UE and the remote UE, configuration information identifying a paging mode for the remote UE; and transmitting paging intended for the remote UE;

transmitting, to the relay UE, an indication that dedicated data is paged for the remote UE;

receiving, from the relay UE, one or more radio resource control (RRC) messages to establish or resume a connection; and establishing or resuming a connection with the remote UE.

23. The method of claim 22, wherein the configuration information is transmitted to the remote UE by forwarding the configuration to the remote UE via the relay UE.

24. The method of claim 22, wherein the configuration information is received via a radio resource control reconfiguration message.

25. The method of claim 22, wherein:

the paging mode comprises direct paging, and transmitting paging intended for the remote UE comprises transmitting paging and one or more system information blocks (SIBs) updates for the remote UE in a Uu connection between the network entity and the remote UE.

26. The method of claim 22, wherein:

the paging mode comprises forward paging, and transmitting paging intended for the remote UE comprises transmitting paging and system information block (SIB) updates to the relay UE for forwarding to the remote UE.

27. The method of claim 26, wherein transmitting paging intended for the remote UE comprises transmitting aggregated paging records associated with the relay UE and the remote UE at a paging occasion associated with the relay UE.

28. The method of claim 27, wherein the aggregated paging includes a relay UE identifier and a remote UE identifier, and each page in the aggregated paging is associated with one of the relay UE identifier or the remote UE identifier.

29. The method of claim 22, further comprising performing dedicated data transmissions with the remote UE based on the connection between the network entity and the remote UE.

30. The method of claim 22, wherein transmitting paging intended for the remote UE comprises transmitting a paging record for the remote UE encapsulated as a radio resource control (RRC) container in an RRC message transmitted to the relay UE.

31. An apparatus for wireless communications by a remote user equipment (UE), comprising:

memory having executable instructions stored thereon; and one or more processors configured to execute the executable instructions and cause the remote UE to:

connect, via a sidelink, to a relay user equipment (UE) connected to a network entity, receive, from a network entity via the relay UE, configuration information identifying a paging mode for the remote UE, calculate paging occasion information for the remote UE and transmitting the calculated paging occasion information to the relay UE, when the paging mode comprises forward paging, and monitor for paging from the network entity, in accordance with the identified paging mode.

32. An apparatus for wireless communications by a relay user equipment (UE), comprising:

memory having executable instructions stored thereon; and one or more processors configured to execute the executable instructions and cause the remote UE to:

connect, via a sidelink, to a remote user equipment (UE) while the relay UE is also connected to a network entity, receive, from the network entity, configuration information identifying a paging mode for the remote UE, forward the configuration information to the remote UE, and monitor for paging from the network entity for the remote UE, in accordance with the identified paging mode for the remote UE; and receive calculated paging occasion information for the remote UE and forwarding paging to the remote UE based on the calculated paging occasion information, when the paging mode comprises forward paging.

* * * * *